(12) United States Patent
Ikeda

(10) Patent No.: US 10,810,442 B2
(45) Date of Patent: Oct. 20, 2020

(54) PEOPLE FLOW ESTIMATION DEVICE, PEOPLE FLOW ESTIMATION METHOD, AND RECORDING MEDIUM

(71) Applicant: NEC Corporation, Tokyo (JP)

(72) Inventor: Hiroo Ikeda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 49 days.

(21) Appl. No.: 16/332,529

(22) PCT Filed: Sep. 11, 2017

(86) PCT No.: PCT/JP2017/032664
§ 371 (c)(1),
(2) Date: Mar. 12, 2019

(87) PCT Pub. No.: WO2018/051944
PCT Pub. Date: Mar. 22, 2018

(65) Prior Publication Data
US 2019/0220673 A1    Jul. 18, 2019

(30) Foreign Application Priority Data

Sep. 13, 2016    (JP) .................................. 2016-178132

(51) Int. Cl.
*G06K 9/00*    (2006.01)
*G06T 7/20*    (2017.01)
(Continued)

(52) U.S. Cl.
CPC ..... *G06K 9/00778* (2013.01); *G06K 9/00342* (2013.01); *G06K 9/2054* (2013.01);
(Continued)

(58) Field of Classification Search
None
See application file for complete search history.

(56) References Cited

U.S. PATENT DOCUMENTS 10,180,326 B2 *    1/2019    Gouda ............... G06K 9/00778
10,186,005 B2 *    1/2019    Hirakawa ............... G06Q 50/12
(Continued)

FOREIGN PATENT DOCUMENTS

JP    2009-211311 A    9/2009
JP    2010-198566 A    9/2010
(Continued)

OTHER PUBLICATIONS

Norikazu Ikoma, "Multiple moving target tracking in dynamic image by random finite set state space model and sequential Monte Carlo filter", IPSJ SIG Technical Report, vol. 2010-CVIM-171 No. 8, Mar. 18, 2010, 8 pages total.

K. Panta et al., "Improved Probability Hypothesis Density (PHD) Filter for Multitarget Tracking", Proceedings of Third International Conference on Intelligent Sensing and Information Processing, ICISIP 2005 [online], IEEE, 2005, 12 pp. 213 to 218, [retrieved on Nov. 24, 2017], Retrieved from the Internet: URL:http://ieeexplore. ieee.org/document/1619438>, DOI:10.1109/ICISIP.2005.1619438, 6 pages total.

(Continued)

*Primary Examiner* — Soo Jin Park
(74) *Attorney, Agent, or Firm* — Sughrue Mion, PLLC

(57) ABSTRACT

An approximate positions-of-people determination means determines, for each partial area, approximate positions of people on an image on the basis of information about the partial area. A states-of-people estimation means, in addition to predicting the current states of particles from the states of particles indicating past states of people and stored in a storage means, adds new particles and evaluates the likelihood of the states of predicted particles and the added particles on the basis of an observation model generated for the observed people to update the weights of the particles, performs particle re-sampling at a probability proportional to the weights of those particles, and outputs the states of the obtained particles as a flow of people.

17 Claims, 16 Drawing Sheets

(51) Int. Cl.
*G06T 7/73* (2017.01)
*G06K 9/20* (2006.01)
(52) U.S. Cl.
CPC ................. *G06T 7/20* (2013.01); *G06T 7/75* (2017.01); *G06K 2209/21* (2013.01); *G06T 2207/30196* (2013.01); *G06T 2207/30242* (2013.01)

(56) References Cited

U.S. PATENT DOCUMENTS

| | | | |
|---|---|---|---|
| 2020/0034632 A1* | 1/2020 | Ikeda | G06K 9/00778 |
| 2020/0034633 A1* | 1/2020 | Ikeda | G06T 7/20 |
| 2020/0175693 A1* | 6/2020 | Takada | G06T 7/20 |
| 2020/0184228 A1* | 6/2020 | Ikeda | G06K 9/00362 |

FOREIGN PATENT DOCUMENTS

| | | |
|---|---|---|
| JP | 2016-91326 A | 5/2016 |
| WO | 2014/207991 A1 | 12/2014 |
| WO | 2016/114134 A1 | 7/2016 |

OTHER PUBLICATIONS

International Search Report dated Dec. 5, 2017 in PCT/JP2017/032664.
Written Opinion dated Dec. 5, 2017 in PCT/JP2017/032664.

\* cited by examiner

PEOPLE FLOW ESTIMATION DEVICE, PEOPLE FLOW ESTIMATION METHOD, AND RECORDING MEDIUM

CROSS REFERENCE TO RELATED APPLICATIONS

This application is a National Stage of International Application No. PCT/JP2017/032664 filed Sep. 11, 2017, claiming priority based on Japanese Patent Application No. 2016-178132 filed Sep. 13, 2016, the disclosure of which are incorporated herein in their entirety by reference.

TECHNICAL FIELD

The present invention relates to a people flow estimation device, a people flow estimation method, and a recording medium for estimating a flow of people (people flow).

BACKGROUND ART

PTL 1 describes a device for specifying tracks of movement of each person. The device described in PTL 1 acquires a frame image from an imaging unit, and detects an upper body of each person being a subject from the frame image. When the device described in PTL 1 detects an area of an upper body of each person in consecutive frame images, the device specifies tracks of movement of each person by regarding areas between which a distance becomes smallest as a same person.

Further, PTL 2 describes a device that generates teacher data for use in learning a dictionary to be used in crowd state recognition processing, and a device that recognizes a crowd state within an image.

Further, PTL 3 describes a moving condition estimation device for estimating a quantity of monitoring targets for each local area of each image by using a plurality of timewise consecutive images, and estimating moving conditions of the monitoring targets from a time-series change in quantity estimated in the each local area.

CITATION LIST

Patent Literature

[PTL 1] Japanese Unexamined Patent Application Publication No. 2009-211311
[PTL 2] International Publication No. WO 2014/207991
[PTL 3] International Publication No. WO 2016/114134

SUMMARY OF INVENTION

Technical Problem

A flow of people may be estimated by the device described in PTL 1.

However, in the device described in PTL 1, it is not possible to accurately estimate a flow of people in a crowded environment. In a crowed environment, overlapping of persons occurs in a frame image, and an upper body of another person is frequently hidden by an upper body of a certain person. Then, a case that an upper body is not detected from a frame image occurs, and it is not possible to identify a same person among consecutive frame images, and thus it is not possible to follow tracks of movement of a person. Therefore, in the device described in PTL 1, it is not possible to accurately estimate a flow of people in a crowded environment.

In view of the above, an object of the present invention is to provide a people flow estimation device, a people flow estimation method, and a recording medium capable of estimating a flow of people even in a crowded environment.

Solution to Problem

One of the present invention is a people flow estimation device. The people flow estimation device includes number-of-people estimation means for estimating, for each partial area of an image, a number of persons within the partial area, based on a partial area image to be specified in the partial area; approximate one's position determining means for correcting the number of persons within the partial area to an integer, determining, for the each partial area, an approximate position of a person by the corrected number of persons on the image, based on information relating to the partial area, calculating a number-of-people correction coefficient, based on the number of persons before correction and the number of persons after correction, and determining that the person is observed at the approximate position; observation model generation means for generating an observation model relating to an observation value representing the person, based on the approximate position of the observed person, for the each observed person, and information relating to the partial area; and states-of-people estimation means for predicting a current state of one or more particles from a past state of the particles representing a past state of the person stored in storage means, adding new particles and updating a weight of the particles by evaluating probability of the predicted state of the particles and a state of the added particles, based on an observation model generated for each observed person and the number-of-people correction coefficient, storing, in the storage means, the state of the particles acquired by resampling the particles with a probability proportional to the updated weight, and outputting the acquired state of the particles as information on a flow of people.

One of the present invention is a people flow estimation device. The people flow estimation device includes coefficient calculation means for calculating a number-of-people correction coefficient, for each partial area of an image to be input, based on a number of persons estimated as a number of persons within the partial area, and a correction value with which the number of persons is corrected; and people flow output means for updating a weight of particles representing a state of a person, based on a particle probability hypothesis density (PHD) filter and the number-of-people correction coefficient, and outputting, as a flow of people, a state of the particles resampled based on the updated weight.

One of the present invention is a people flow estimation method. The people flow estimation method includes the following steps.

Estimating, for each partial area of an image, a number of persons within the partial area, based on a partial area image to be specified in the partial area; correcting, for the each partial area, the number of persons within the partial area to an integer, determining an approximate position of a person by the corrected number of persons on the image, based on information relating to the partial area, calculating a number-of-people correction coefficient, based on the number of persons before correction and the number of persons after correction, and determining that the person is observed at the approximate position;

generating, for each observed person, an observation model relating to an observation value representing the person, based on the approximate position of the observed person and information relating to the partial area; and predicting a current state of the particles from a state of the particles representing a past state of the person stored in storage means, adding new particles and updating a weight of the particles by evaluating probability of the predicted state of the particles and a state of the added particles, based on an observation model generated for each observed person and the number-of-people correction coefficient, storing, in the storage means, a state of the particles acquired by resampling the particles with a probability proportional to the updated weight, and outputting the acquired state of the particles as information on a flow of people.

One of the present invention is a people flow estimation method. The people flow estimation method includes the following steps.

Calculating a number-of-people correction coefficient, for each partial area of an image to be input, based on a number of persons estimated as the number of persons within the partial area, and a correction value with which the number of persons is corrected; and updating a weight of the particles representing a state of the person, based on a particle probability hypothesis density (PHD) filter and the number-of-people correction coefficient, and outputting, as a flow of people, a state of the particles resampled based on the updated weight.

One of the present invention is a non-transitory recording medium having a people flow estimation program recorded therein. The people flow estimation program causing a computer to execute: number-of-people estimation processing of estimating, for each partial area of an image, a number of persons within the partial area, based on a partial area image to be specified in the partial area; approximate one's position determining processing of correcting the number of persons within the partial area to an integer, for the each partial area, determining an approximate position of the person by the corrected number of persons on the image, based on information relating to the partial area, calculating a number-of-people correction coefficient, based on the number of persons before correction and the number of persons after correction, and determining that the person is observed at the approximate position; observation model generation processing of generating, for the each observed person, an observation model relating to an observation value representing the person, based on the approximate position of the observed person and information relating to the partial area; and states-of-people estimation processing of predicting a current state of one or more particles from a state of the particles representing a past state of the person stored in storage means, adding new particles and updating a weight of the particles, by evaluating probability of the predicted state of the particles and a state of the added particles, based on the observation model generated for each observed person and the number-of-people correction coefficient, storing, in the storage means, a state of the particles acquired by resampling the particles with a probability proportional to the updated weight, and outputting the acquired state of the particles as information on a flow of people.

One of the present invention is a non-transitory recording medium having a people flow estimation program recorded therein. The people flow estimation program causing a computer to execute: coefficient calculation processing of calculating a number-of-people correction coefficient, for each partial area of an image to be input, based on a number of persons estimated as a number of persons within the partial area, and a correction value with which the number of persons is corrected; and people flow output processing of updating a weight of one or more particles representing a state of a person, based on a particle probability hypothesis density (PHD) filter and the number-of-people correction coefficient, and outputting, as a flow of people, a state of the particles resampled based on the updated weight.

Advantageous Effects of Invention

According to the present invention, it is possible to estimate a flow of people even in a crowded environment.

EXAMPLE EMBODIMENT

In the following, example embodiments of the present invention are described with reference to the drawings.

First Example Embodiment

Figure 1:
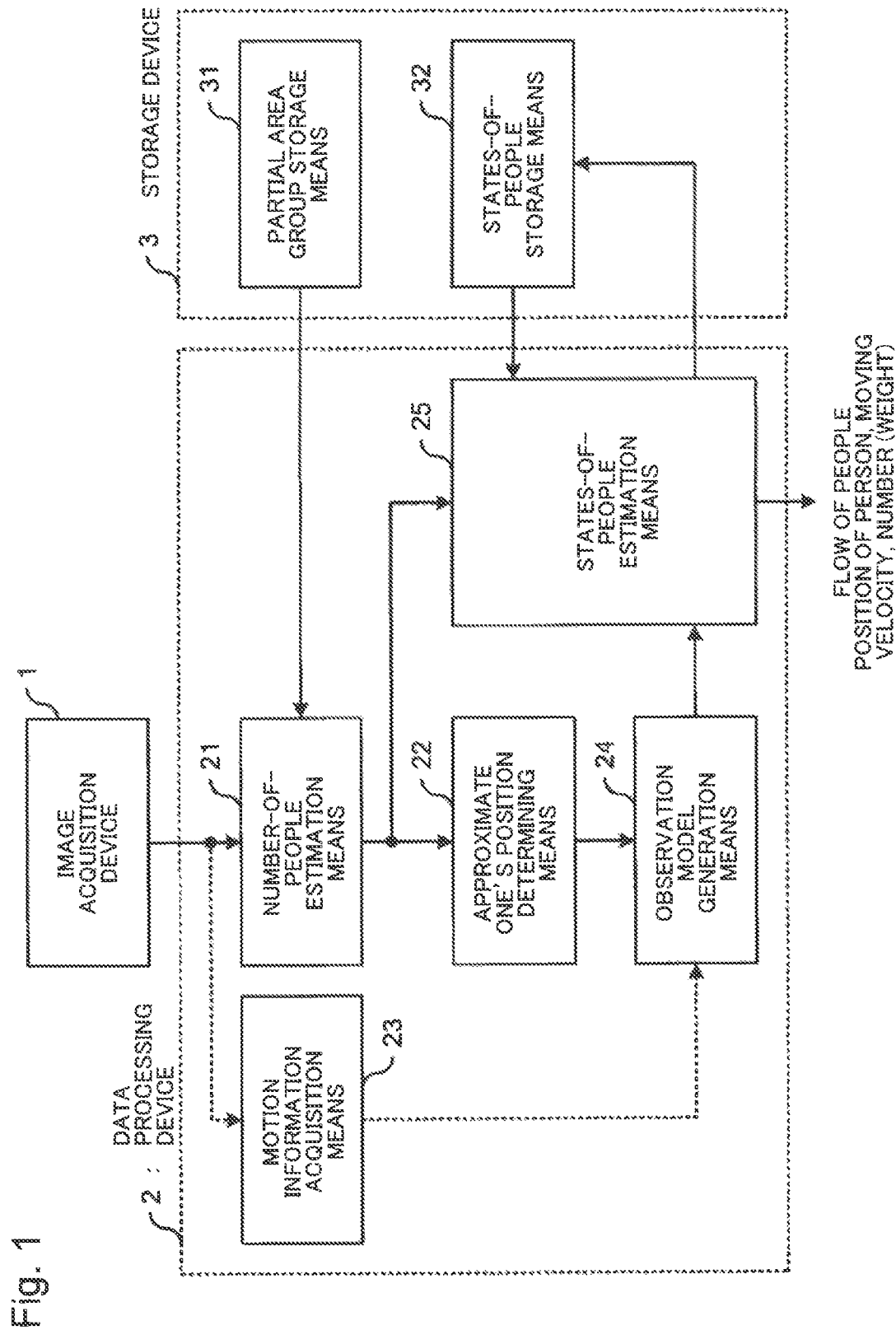
FIG. 1 is a block diagram illustrating a configuration example of a people flow estimation device in a first example embodiment of the present invention.

FIG. 1 is a block diagram illustrating a configuration example of a people flow estimation device in a first example embodiment of the present invention. The people flow estimation device in the first example embodiment includes an image acquisition device 1, a data processing device 2 to be operated by program control, and a storage device 3 for storing information. The image acquisition device 1 acquires an image from an output of an imaging device such as a camera, or an output of a video device such as video equipment.

The storage device 3 includes a partial area group storage means 31 and a states-of-people storage means 32.

The partial area group storage means 31 stores a position and a size of an individual partial area disposed within an image to be acquired by the image acquisition device 1. A position and a size of each partial area are determined in advance by a manager of a people flow estimation device, for example. In the following, an example of determining a partial area by a manager is described. Basically, a manager may determine a position and a size of an individual partial area in such a way that an entirety of an image is covered by a plurality of partial areas. However, a configuration for determining a partial area is not limited to the above-described example. For example, a manager may determine the plurality of partial areas only for an area within an image where a flow of people is estimated. Further, a manager may determine each partial area in such a way that partial areas overlap one another. Further, a manager may determine a partial area depending on a function of a number-of-people estimation means 21 to be described later, and the like. The partial area group storage means 31 stores in advance a position and a size of each determined partial area. Note that, in the above-described example, a case where a manager determines a partial area is described. Alternatively, a program may automatically determine a partial area in accordance with a predetermined rule.

Hereinafter, an image of a portion corresponding to a partial area within an image acquired by the image acquisition device 1 is described as a partial area image.

The states-of-people storage means 32 stores a state of a particle representing a state of a person. As a state of a particle, there are items such as a position of a person, a moving velocity (moving direction and speed) of a person, and a weight indicating a number of persons. A state of one person is represented by states of a predetermined number of particles. Hereinafter, the predetermined number of particles is described as a number of particles per person. For example, when one person is represented by one hundred particles, a weight representing a number of persons becomes $1/100=0.01$ per particle. A total of weights of each particle becomes the number of persons.

Further, each example embodiment describes a case where a head position of a person is a position of a person. Alternatively, feet of a person or a position of a center of a body may be set as a position of a person. Further, a specific part of a person may be set as a position of a person.

Further, a position or a moving velocity on a real space plane simulating a ground is employed, as a position or a moving velocity of a person. However, a position or a moving velocity on an image may be employed, as a position or a moving velocity of a person. Further, another item relating to a person such as a real height may be added to a state of a particle.

The data processing device 2 includes the number-of-people estimation means 21, an approximate one's position determining means 22, a motion information acquisition means 23, an observation model generation means 24, and a states-of-people estimation means 25.

The number-of-people estimation means 21 estimates a number of persons within each of partial areas, based on each of partial area images in an image acquired by the image acquisition device 1, and based on a predetermined partial area (in other words, based on a position and a size of each partial area stored in the partial area group storage means 31 in advance). The number-of-people estimation means 21 may estimate the number of persons within a partial area by employing an estimator acquired by learning. In this case, for example, the number-of-people estimation means 21 acquires, in advance by learning, the estimator configured to output the number of persons within a partial area in response to input of a partial area image. The number-of-people estimation means 21 may determine, as an estimated value of the number of persons within a partial area, the number of persons acquired by the estimator inputting the partial area image. When the above-described estimator is learned, a plurality of combinations of a partial area image indicating a crowd constituted of a plurality of persons, and information on a number of persons associated with the partial area image may be generated, and each of the combinations may be employed as teacher data. The partial area image for use in learning also includes an image in which persons overlap one another. This learning may be referred to as learning on the basis of a partial area. Further, the technique described in PTL 2 may be employed in this learning.

Note that a method for estimating a number of persons within a partial area by the number-of-people estimation means 21 is not limited to the above-described method. The number-of-people estimation means 21 may estimate a number of persons within a partial area by another method.

Further, it is assumed that an estimation result on a number of persons by the number-of-people estimation means 21 is represented by numbers including a decimal point.

Figure 2:
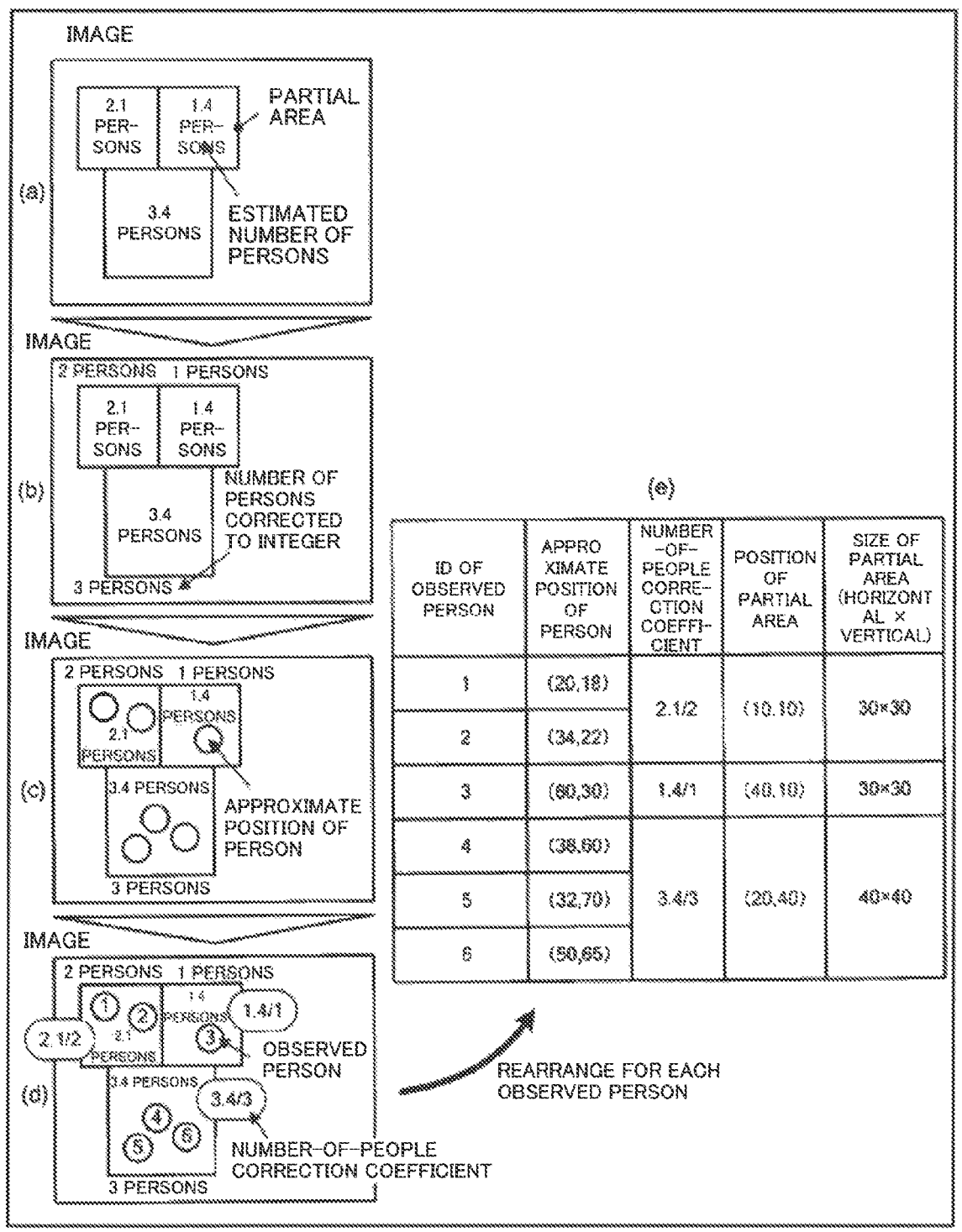
FIG. 2 is a schematic diagram illustrating a processing example of an approximate one's position determining means.

FIG. 2 is a schematic diagram illustrating a processing example of the approximate one's position determining means 22. A processing (2) in FIG. 2 illustrates an example of a number of persons estimated for each partial area.

The approximate one's position determining means 22 corrects a number of persons (a number of persons represented by numbers including a decimal point) within a partial area estimated by the number-of-people estimation means 21 to a countable number (namely, an integer), for each partial area (see a processing (b) in FIG. 2). Further, the approximate one's position determining means 22 determines an approximate position of a person by the corrected number of persons on the image acquired by the image acquisition device 1, based on a position and a size of a partial area, for each partial area (see a processing (c) in FIG. 2). Furthermore, the approximate one's position determining means 22 calculates a number-of-people correction coefficient, based on a number of persons before correction (a number of persons estimated by the number-of-people estimation means 21) and a number of persons after correction, for each partial area (see a processing (d) in FIG. 2). Then, the approximate one's position determining means 22 determines that a person is observed at an approximate position of a person. Further, the approximate one's position determining means 22 rearranges the approximate position of a person, the number-of-people correction coefficient, and the position and the size of a partial area, for each observed person. Data set (e) in FIG. 2 schematically illustrates a result of the rearrangement. In the result of the rearrangement, a number-of-people correction coefficient of each person observed in a same partial area, and a position and a size of a partial area all become a same value.

The approximate one's position determining means 22 may correct a number of persons before correction to an integer by rounding off, rounding up, or rounding down the first decimal place, for example. Further, the approximate one's position determining means 22 may update a number of persons after correction to 1, when the number of persons after correction is 0, and when the number of persons before correction is larger than 0 by the above-described method.

Further, when the number-of-people estimation means 21 estimates a number of persons, based on a head of a person, an approximate position of a person described herein is a head position of a person. An approximate position of a person is determined based on the number-of-people determination means 21.

Further, the approximate one's position determining means 22 may determine a random position within a partial area, as an approximate position of a person. Alternatively, the approximate one's position determining means 22 may determine a center position of a partial area, as an approximate position of a person. Further, the approximate one's position determining means 22 may specify a person's area within a partial area (area where a person appears as an image within a partial area), and determine, as an approximate position of a person, a random position in a person's area within a partial area. A method for specifying a person's area within a partial area is not specifically limited. As far as the approximate one's position determining means 22 determines an approximate position of a person, based on a position and a size of a partial area, an approximate position of a person may be determined by a method different from the above-described method.

A number-of-people correction coefficient is a coefficient with which it is possible to acquire a number of persons before correction by calculating a product with respect to a number of persons after correction. The approximate one's position determining means 22 calculates a number-of-people correction coefficient by dividing a number of persons before correction by a number of persons after correction, for each partial area.

The motion information acquisition means 23 acquires motion information (motion vector) on an image, based on an image acquired by the image acquisition device 1. Specifically, the motion information acquisition means 23 calculates a motion vector being an optical flow by using a new image and a past image. Both of a new image and a past image are images acquired by the image acquisition device 1. For example, the motion information acquisition means 23 may calculate a motion vector by a Lucas-Kanade method. The Lucas-Kanade method is a method for calculating a motion vector on the basis of a feature point. Further, for example, the motion information acquisition means 23 may calculate a motion vector by a Horn-Schunck method or a Gunnar Farneback method. The Horn-Schunck method or the Gunnar Farneback method is a method for calculating a dense motion vector on the basis of a pixel. The motion information acquisition means 23 may calculate a motion vector by another method.

The observation model generation means 24 generates an observation model (likelihood function) relating to an observation value representing a person, based on an approximate position of an observed person, for each observed person, and information relating to a partial area. Examples of information relating to a partial area are, for example, a variance of an observation value determined based on a position and a size of a partial area, and motion information within a partial area. In other words, information relating to a partial area is information acquirable based on a position and a size of a partial area.

An observation value representing a person is observable from an image or the like, and is able to evaluate a possibility representing a person. Examples of an observation value representing a person include, for example, a position of a person on an image or on a real space plane, a size of a person on an image or on a real space plane, and a moving velocity of a person on an image or on a real space plane. The people flow estimation device in the present example embodiment may employ observation values of a plurality of types, as an observation value representing a person. In this case, the observation model generation means 24 generates observation models of a plurality of types for an observed person.

An observation model relating to an observation value representing a person is a model (likelihood function) indicating a probability with which an observation value representing a person is generated in a condition in which a state of a person is determined. The higher a probability based on an observation model is, the more probable it is evaluated that an observation value represents a person, and a state of a person as a condition is certain. In other words, by acquiring a probability representing a person by an observation model, from an observation value calculated based on a state of a particle (state of a person), it is possible to evaluate a probability of a state of a particle by a height of the probability.

The following are examples of a specific method for generating an observation model.

First Example

It is assumed that an observation value denotes a position of a person on an image. Herein, more specifically, it is assumed that an observation value denotes a head position of a person on an image. In this case, the approximate one's position determining means 22 determines an approximate position of a head of a person on an image. The closer an observation value (a head position on an image) is to an approximate position of the head of the person, it is assumed that the observation value is "likely to represent a person" (certain that the observation value represents a person). For example, when a head position of a person on an image is an observation value, the observation model generation means 24 is able to generate an observation model expressed by the following Eq. (1). Note that an observation value is acquired based on a state of a particle.

[Eq. 1]

$$L(o|x) = \frac{1}{\sqrt{2\pi\sigma_o^2}} \exp\left(\frac{-|o'-o|^2}{2\sigma_o^2}\right) \quad (1)$$

In Eq. (1), x denotes a state of a particle (state of a person). o denotes a head position of the person on an image acquired based on the state of the particle. Specifically, o denotes an observation value. o' denotes an approximate position of the head of the person on an image determined by the approximate one's position determining means 22. $\sigma_o^2$ denotes a variance of an observation value (head position on the image acquired from the state of the particle), which is determined based on a position and a size of a partial area.

Second Example

It is assumed that an observation value denotes a size of a person on an image. Herein, more specifically, it is assumed that an observation value denotes a head size of a person on an image. Further, it is assumed that a head size denotes a vertical size of a head. In this case, the approximate one's position determining means 22 determines an approximate position of a head of a person on an image. The closer an observation value (a head size on an image to be calculated based on a state of a particle) is to a head size to be acquired based on the approximate position, a camera parameter of an imaging device for imaging an image (parameter representing a focal length, a lens distortion, a position, a posture, and the like of an imaging device), and a real height of a person, it is assumed that the observation value is likely to represent a person. For example, when a head size of a person on an image is an observation value, the observation model generation means 24 is able to generate an observation model expressed by the following Eq. (2). Note that a predetermined constant may be employed as a real height of a person. Further, as far as a height of a person is also included in a state of a particle, the height may be employed as a real height of a person.

[Eq. 2]

$$L(s|x) = \frac{1}{\sqrt{2\pi\sigma_s^2}} \exp\left(\frac{-(s'-s)^2}{2\sigma_s^2}\right) \quad (2)$$

In Eq. (2), x denotes a state of a particle (state of a person). s denotes a head size of the person on an image acquired based on the state of the particle. s denotes an observation value. s' denotes a head size to be acquired based on an approximate position of the head of the person on an image determined by the approximate one's position determining means 22, a camera parameter, and a real height. $\sigma_s^2$ denotes a variance of a head size to be determined based on a range of head sizes to be acquired from a position and a size of a partial area, a camera parameter, and a real height.

Third Example

It is assumed that an observation value denotes a moving velocity of a person on an image. Herein, more specifically, it is assumed that an observation value denotes a motion vector of a head of a person on an image. In this case, the approximate one's position determining means 22 determines an approximate position of a head of a person on an image. Then, the observation model generation means 24 acquires an average of motion vectors, from motion vectors in the vicinity of the approximate position. The observation model generation means 24 may acquire motion vectors in the vicinity of an approximate position of a head (specifically, motion vectors, based on which an average motion vector is acquired), based on a motion vector calculated by the motion information acquisition means 23, and an approximate position of a head. The closer an observation value (motion vector of a head on an image to be calculated based on a state of a particle) is to an average motion vector, it is assumed that the observation value is more likely to represent a person. For example, when an observation value denotes a motion vector of a head of a person on an image, the observation model generation means 24 is able to generate an observation model expressed by the following Eq. (3).

[Eq. 3]

$$L(v_i|x) = \frac{1}{\sqrt{2\pi\sigma_v^2}} \exp\left(\frac{-|v_i'-v_i|^2}{2\sigma_v^2}\right) \quad (3)$$

In Eq. (3), x denotes a state of a particle (state of a person). $v_i$ denotes a motion vector of the head of the person on an image acquired based on the state of the particle. $v_i$ denotes an observation value. $v_i'$ denotes the above-described average motion vector. $\sigma_v^2$ denotes a variance of an observation value determined based on a position and a size of a partial area, a camera parameter, a real height, and a general walking speed. A general walking speed may be a predetermined constant, for example.

Fourth Example

It is assumed that an observation value denotes a moving velocity of a person on an image. Herein, more specifically, it is assumed that an observation value denotes a direction and a speed indicated by a motion vector of a head on an image. The direction (moving direction) and the speed may be referred to as a two-dimensional feature. In this case, the closer an observation value (a direction and a speed indicated by a motion vector to be acquired from a state of a particle) is to a direction indicated by a motion vector and a speed of a particle within a partial area associated with an observed person, it is assumed that the observation value is likely to represent a person. In this case, the observation model generation means 24 generates a two-dimensional histogram as an observation model by using a direction indicated by a motion vector and a speed of a particle within a partial area associated with an observed person. The observation model generation means 24 normalizes a total of frequencies of the two-dimensional histogram to 1.

Fifth Example

It is assumed that an observation value denotes a moving direction of a person on an image. Herein, more specifically, it is assumed that an observation value denotes a direction indicated by a motion vector of a head on an image. In this case, the closer an observation value (direction indicated by a motion vector to be acquired from a state of a particle) is to a direction indicated by a motion vector within a partial area associated with an observed person, it is assumed that the observation value is likely to represent a person. In this case, the observation model generation means 24 generates a direction histogram as an observation model by using a direction indicated by a motion vector within a partial area associated with an observed person. The observation model generation means 24 normalizes a total of frequencies of the histogram to 1.

Sixth Example

It is assumed that an observation value denotes a moving speed of a person on an image. Herein, more specifically, it is assumed that an observation value denotes a speed indicated by a motion vector of a head on an image. In this case, the closer an observation value (speed indicated by a motion vector to be acquired from a state of a particle) is to a speed indicated by a motion vector within a partial area associated with an observed person, it is assumed that the observation value is likely to represent a person. In this case, the observation model generation means 24 generates a speed histogram as an observation model by using a speed indicated by a motion vector within a partial area associated with an observed person. The observation model generation means 24 normalizes a total of frequencies of the histogram to 1.

The observation model generation means 24 basically generates an observation model for each observed person. When observation values of a plurality of types are employed, the observation model generation means 24 generates a plurality of observation models associated with the observation values of the plurality of types, for each observed person.

The states-of-people estimation means 25 predicts a current state of a particle, based on a physical model, from a past state of a particle (representing a state of a person) stored in the states-of-people storage means 32. Further, the states-of-people estimation means 25 additionally generates a new particle. Furthermore, the states-of-people estimation means 25 updates a weight of a particle by evaluating a probability of a current state of a particle, based on an observation model generated for each observed person and a number-of-people correction coefficient. Then, the states-of-people estimation means 25 resamples (to be described later) a particle with a probability proportional to a weight of a particle after updating. The states-of-people estimation means 25 stores, in the states-of-people storage means 32, a state of a particle acquired as a result of the resampling, and outputs the acquired state of the particle, as a flow of people. Specifically, the states-of-people estimation means 25 outputs, as a flow of people, a position of a person indicated by a state of a particle, a moving velocity of a person, and a weight indicating a number of persons. In this way, in the present example embodiment, a flow of people is represented by a position of a person, a moving velocity of a person, and a number of persons. Note that, when a real height is included in a state of a particle, the real height does not need to be an output target.

A configuration for outputting a state of a particle as a flow of people by the states-of-people estimation means 25 is not specifically limited. For example, the states-of-people estimation means 25 may display and output, to a display device (not illustrated in FIG. 1), a state of a particle representing a flow of people. Further, the states-of-people estimation means 25 may print and output, to a printing device (not illustrated), a state of a particle representing a flow of people. Furthermore, the states-of-people estimation means 25 may output, to an external device, a state of a particle representing a flow of people as data.

The states-of-people estimation means 25 may utilize a general particle probability hypothesis density (PHD) filter.

Figure 3:
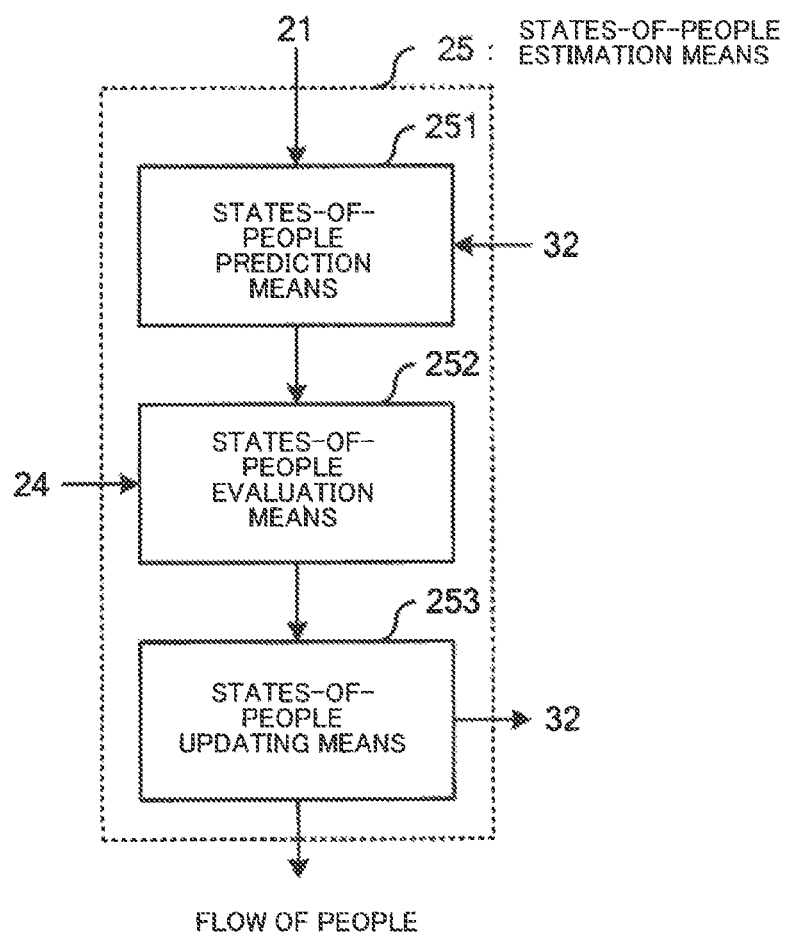
FIG. 3 is a block diagram illustrating a configuration example of a states-of-people estimation means.

FIG. 3 is a block diagram illustrating a configuration example of the states-of-people estimation means 25. The states-of-people estimation means 25 includes a states-of-people prediction means 251, a states-of-people evaluation means 252, and a states-of-people updating means 253.

The states-of-people prediction means 251 predicts a current state of a particle, based on a physical model, from a past state of a particle representing a past state of a person stored in the states-of-people storage means 32. Further, the states-of-people prediction means 251 additionally generates a new particle. A particle to be newly added is based on a hypothesis that a person newly appears.

The above-described hypothesis is specifically described by assuming that a current time is t, and a past time is t−1. It is assumed that a minute elapsed time for predicting a state of a particle at a current time (time t) from a state of a particle at a past time (time t−1) is dt. Further, it is assumed that a hypothesis that a person performs uniform linear motion during the minute elapsed time dt is established to some extent. The states-of-people prediction means 251 performs calculation expressed by the following Eq. (4), and predicts a current state of a particle from a past state of a particle. Note that, when a real height is included in a state of a particle, it is assumed that the real height does not change. A method for predicting a current state of a particle by the states-of-people prediction means 251 is not limited to the above-described method, and may be another method.

[Eq. 4]

$$X_t = X_{t-1} + u_{t-1}dt + \varepsilon_X$$

$$Y_t = Y_{t-1} + v_{t-1}dt + \varepsilon_Y$$

$$u_t = u_{t-1} + \varepsilon_u$$

$$v_t = v_{t-1} + \varepsilon_v$$

$$w_t = P_s w_{t-1} \qquad (4)$$

In Eq. (4), (X, Y) denotes a position of a particle. (u, v) denotes a moving velocity of a particle. w denotes a weight of a particle. $\varepsilon_X$, $\varepsilon_Y$, $\varepsilon_u$, and $\varepsilon_v$ denote Gaussian noises. Note that noises to be used in Eq. (4) may be noises other than a Gaussian noise. $P_s$ denotes a survival probability (probability with which a particle survives without disappearing), and $0 < P_s < 1$.

Further, the states-of-people prediction means 251 determines a number of particles to be newly added, based on a number of persons within a partial area to be estimated by the number-of-people estimation means 21, for each partial area. The states-of-people prediction means 251 determines a number of particles to be newly added, for each partial area, by calculating a number of persons within a partial area×a number of particles per person×an appearance probability $P_b$ of a person. The states-of-people prediction means 251 generates (in other words, adds) a determined number of particles, for each partial area. At this occasion, the states-of-people prediction means 251 adds a determined number of particles at a position based on an associated partial area. For example, the states-of-people prediction means 251 adds a new particle at a position uniformly distributed within a partial area. When it is assumed that a position of a particle is present on a real space plane, the states-of-people prediction means 251 converts the position of the particle on the real space plane, based on a real height of a person, and a camera parameter of an imaging device. Further, regarding a moving velocity of a particle, the states-of-people prediction means 251 determines a moving velocity of a particle to be newly added to a velocity uniformly distributed in a range of moving velocities adaptable to a person, for example. Further, the states-of-people prediction means 251 sets a weight of a new particle to "1/a number of particles per person". Specifically, the states-of-people prediction means 251 sets a value acquired by dividing 1 by a number of particles per person, as a weight of a new particle. The above-described appearance probability $P_b$ satisfies $0 < P_b < 1$. The appearance probability $P_b$ may be a predetermined certain value. Alternatively, the states-of-people prediction means 251 may change the appearance probability $P_b$ depending on a position of a partial area in an image.

When a real height is included in a state of a particle, the states-of-people prediction means 251 may determine a real height indicated by a new particle in a uniformly distributed manner, based on heights adaptable to a person. Alternatively, the states-of-people prediction means 251 may determine a real height indicated by a new particle depending on a distribution indicated by statistical information in the past.

In the foregoing, an example of a method for generating a new particle is described. The states-of-people prediction means 251, however, may generate a new particle by another method. For example, the states-of-people prediction means 251 may generate particles of a predetermined number at random within an entirety of an image. Further, for example, the states-of-people prediction means 251 may generate particles of a predetermined number at random, while setting a specific position where a person is likely to appear within an image, as a center.

The states-of-people evaluation means 252 evaluates a probability of a state of a particle associated with an observed person, based on an observation model generated by the observation model generation means 24, for each observed person. Specifically, the states-of-people evaluation means 252 calculates an observation value from a state of a particle; and calculates a probability of the observation value by using the observation value, and an observation model generated by the observation model generation means 24 for each observed person. The probability represents a probability of a state of a particle associated with an observed person. When there are a plurality of types of observation values, the states-of-people evaluation means 252 evaluates a probability of a state of a particle regarding observation values of all types.

The following are examples of a method for calculating an observation value from a state of a particle.

For example, it is assumed that an observation value denotes a head position on an image. In this case, the states-of-people evaluation means 252 is able to calculate an observation value being a head position on an image by using a position of a particle, a real height of a person, and a camera parameter of an imaging device.

For example, it is assumed that an observation value denotes a head size on an image. In this case, the states-of-people evaluation means 252 is able to calculate an observation value being a head size on an image by using a position of a particle, a real height of a person, a predetermined real head size, and a camera parameter of an imaging device. A predetermined real head size may be determined as a predetermined constant, for example.

For example, it is assumed that an observation value denotes a motion vector of a head on an image. In this case, the states-of-people evaluation means 252 is able to calculate an observation value being a motion vector of a head on an image by using a current position of a particle, a past position of a particle acquired from the current position of the particle and a moving velocity, a real height of a person, and a camera parameter of an imaging device.

Note that a predetermined constant may be employed as a real height of a person. Further, when a state of a particle also indicates a height of a person, the height may also be employed as a real height of a person.

The states-of-people updating means 253 updates a weight of a particle by evaluating a probability of a state of a particle for all observed persons, based on a value of a probability indicating a probability of a state of a particle associated with an observed person, which is calculated by the states-of-people evaluation means 252, a number-of-people correction coefficient for each observed person, and a weight of a particle before updating. The states-of-people updating means 253 performs this processing in a condition that a total number of persons within a partial area acquired by the number-of-people estimation means 21 and a total of updated weights of particles are made equal to each other. The number-of-people updating means 253 resamples a particle with a probability proportional to a weight of a particle after updating. Further, the states-of-people updating means 253 stores a state of a particle acquired by resampling in the states-of-people storage means 32, and outputs the acquired state of the particle as a flow of people.

The states-of-people updating means 253 updates a weight of a particle by evaluating a probability of a state of a particle in a condition that a total number of persons within a partial area and a total of updated weights of particles are made equal to each other. Therefore, the states-of-people updating means 253 is able to reflect a probability of a state of a particle to a weight of a particle, while satisfying a condition that a weight of a particle represents a number of persons. The states-of-people updating means 253 calculates a weight of a particle by calculation with use of the below-described Eq. (5) by using a value of a probability indicating a probability of a state of a particle associated with an observed person, which is calculated by the states-of-people evaluation means 252, a number-of-people correction coefficient for each observed person, and a weight of a particle before updating. The weight represents evaluation on a probability of a state of a particle for all observed persons. The heavier a weight of a particle is, the more probable a state of the particle is. The states-of-people updating means 253 updates a weight of a particle with a weight calculated by Eq. (5). Eq. (5) is an equation acquired by adding a number-of-people correction coefficient associated with an observed person to an equation on a general particle PHD filter. It is possible to set a detection probability of each particle, a probability density of a clutter in each observation value, and the like in an equation on a general particle PHD filter. The same idea is also applied to the present example embodiment.

[Eq. 5]

$$w_{t'}^{(i)} = \sum_{j=1}^{M} \frac{C_t^{(j)} L(z_t^{(j)} | x_t^{(i)}) w_t^{(i)}}{\sum_{k=1}^{N} L(z_t^{(j)} | x_t^{(k)}) w_t^{(k)}} \quad (5)$$

In Eq. (5), t' denotes after updating, and t denotes before updating (current time). $w_{t'}^{(i)}$ denotes a weight of a particle after updating for the i-th particle. $w_t^{(i)}$ denotes a weight of a particle before updating for the i-th particle. $x_t^{(i)}$ denotes a state of a particle for the i-th particle. $z_t^{(j)}$ denotes an observation value for the j-th observed person. $L(z_t^{(j)}|x_t^{(i)})$ denotes a probability of a state of a particle for the i-th particle associated with the j-th observed person, and is represented by a probability. $C_t^{(j)}$ denotes a number-of-people correction coefficient for the j-th observed person. M denotes a total number (integer) of observed persons. N denotes a total number of particles.

$L(z_t^{(j)}|x_t^{(i)})$ denotes a probability of a state of a certain particle associated with a certain observed person. The left side of Eq. (5) denotes a probability of a state of a certain particle for all observed persons.

When there are a plurality of types of observation values, a value of a probability $L(z_t^{(j)}|x_t^{(i)})$ indicating a probability of a state of a particle represents a product of a value of a probability depending on a number of types of observation values. For example, it is assumed that there are three types of observation values, and the respective observation values are $z'^{(j)}_t$, $z''^{(j)}_t$, and $z'''^{(j)}_t$. In this case. $L(z^{(j)}_t|x^{(i)}_t)$ is expressed by the following equation.

$$L(z^{(j)}_t|x^{(i)}_t)=L(z'^{(j)}_t|x^{(i)}_t) \times L(z''^{(j)}_t|x^{(i)}_t) \times L(z'''^{(j)}_t|x^{(i)}_t)$$

Further, the states-of-people updating means 253 performs the following processing in order to restore a weight of a particle to a basic weight being "1/number of particles per person". Hereinafter, "1/number of particles per person" is described as a basic weight. The states-of-people updating means 253 determines a number of particles that makes a total of updated weights of particles and a total of basic weights equal to each other. When it is assumed that the number of particles is Q, the states-of-people updating means 253 determines the above-described number of particles by solving a problem: a total of updated weights of particles=basic weight×Q, regarding Q. Next, the states-of-people updating means 253 extracts particles of the determined number (Q) with a probability proportional to an updated weight of a particle. For example, it is assumed that one particle is extracted by one-time extraction processing. In this case, the states-of-people updating means 253 extracts one particle, based on a probability proportional to an updated weight of each particle. The states-of-people updating means 253 may extract Q particles by performing this processing Q times (resampling). The states-of-people updating means 253 performs filtering with respect to a particle in such a way that the number of particles having a heavy weight after updating increases, and particles having a light weight after updating are discarded. Then, the states-of-people updating means 253 changes each of weights of extracted Q particles to a basic weight (1/number of particles per person). Further, the states-of-people updating means 253 stores states of these particles in the states-of-people storage means 32, and outputs the states of these particles as a flow of people. Specifically, the states-of-people estimation means 25 outputs, as a flow of people, a position of a person indicated by a state of a particle, a moving velocity of a person, and a number of persons. Note that a number of persons is represented by a total of weights of particles. Further, a flow of people is represented by a position of a person, a moving velocity of a person, and a number of persons.

Note that, although, in the present example embodiment, a flow of people is estimated, based on persons, a flow of objects may be estimated, based on objects other than persons.

The number-of-people estimation means 21, the approximate one's position determining means 22, the motion information acquisition means 23, the observation model generation means 24, and the states-of-people estimation means 25 (states-of-people estimation means 25 including the states-of-people prediction means 251, the states-of-people evaluation means 252, and the states-of-people updating means 253) are implemented by a central processing unit (CPU) of a computer, for example. In this case, a CPU may read a people flow estimation program from a program recording medium such as a program storage device (not illustrated) of a computer, and be operated as the number-of-people estimation means 21, the approximate one's position determining means 22, the motion information acquisition means 23, the observation model generation means 24, and the states-of-people estimation means 25 in accordance with the program.

Figure 4:
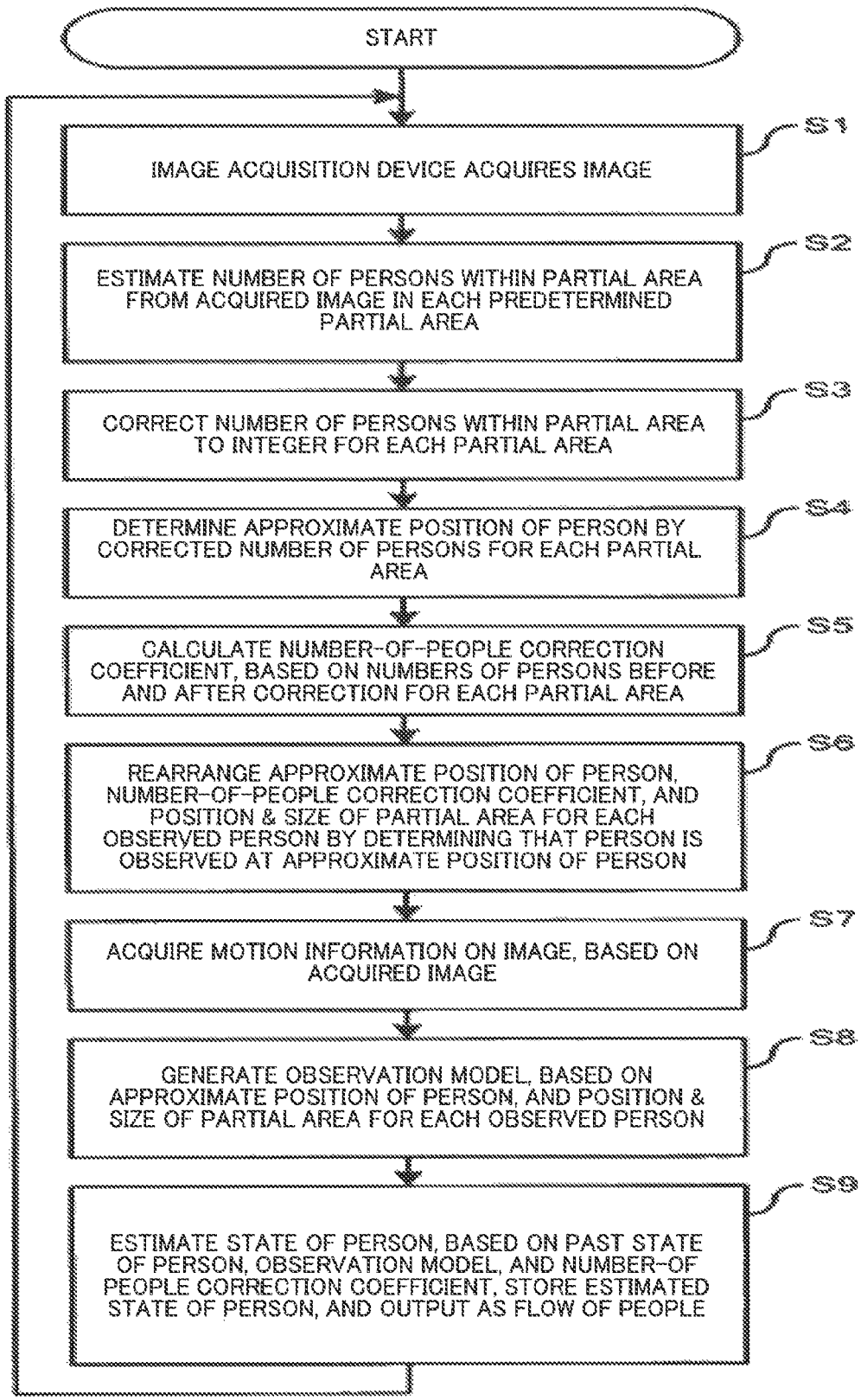
FIG. 4 is a flowchart illustrating an example of a processing progress in the first example embodiment of the present invention.

Next, a processing progress is described. FIG. 4 is a flowchart illustrating an example of a processing progress in the first example embodiment of the present invention. Details on already described processing are omitted as necessary.

First, the image acquisition device 1 acquires an image from an output of an imaging device such as a camera, and an output of a video device such as video equipment (Step S1).

Next, the number-of-people estimation means 21 estimates a number of persons within each partial area, based on each partial area image of the image acquired by the image acquisition device 1, by a predetermined partial area (Step S2).

Next, the approximate one's position determining means 22 corrects a number of persons (a number of persons represented by numbers including a decimal point) within a partial area estimated by the number-of-people estimation means 21 to an integer, for each partial area (Step S3). The approximate one's position determining means 22 determines an approximate position of a person by the corrected number of persons on the image, based on a position and a size of a partial area, for each partial area (Step S4). Further, the approximate one's position determining means 22 calculates a number-of-people correction coefficient, based on a number of persons before correction and a number of persons after correction, for each partial area (Step S5). The approximate one's position determining means 22 rearranges the approximate position of a person, the number-of-people correction coefficient, and the position and the size of a partial area, for each observed person, by determining that a person is observed at an approximate position of a person (Step S6).

The motion information acquisition means 23 acquires motion information on an image, based on the image acquired in Step S1 (Step S7).

The observation model generation means 24 generates an observation model relating to an observation value representing a person, based on an approximate position of a person associated with an observed person, and information relating to a partial area, for each observed person (Step S8).

The states-of-people estimation means 25 predicts a current state of a particle, based on a physical model, from a state of a particle representing a past state of a person stored in the states-of-people storage means 32. Further, the states-of-people estimation means 25 additionally generates a new particle. Furthermore, the states-of-people estimation means 25 updates a weight of a particle by evaluating a probability of a current state of a particle, based on an observation model generated for each observed person and a number-of-people correction coefficient. Then, the states-of-people estimation means 25 resamples a particle with a probability proportional to an updated weight of a particle. The states-of-people estimation means 25 stores a state of a particle acquired as a result of the resampling in the states-of-people storage means 32, and outputs, as a flow of people, a position of a person indicated by the acquired state of the particle, a moving velocity of a person, and a number of persons (Step S9).

The people flow estimation device repeats Steps S1 to S9, while the image acquisition device 1 acquires an image. Further, the people flow estimation device may perform Step S7 before Step S2. Furthermore, the people flow estimation device may perform Step S5 before Step S4.

Figure 5:
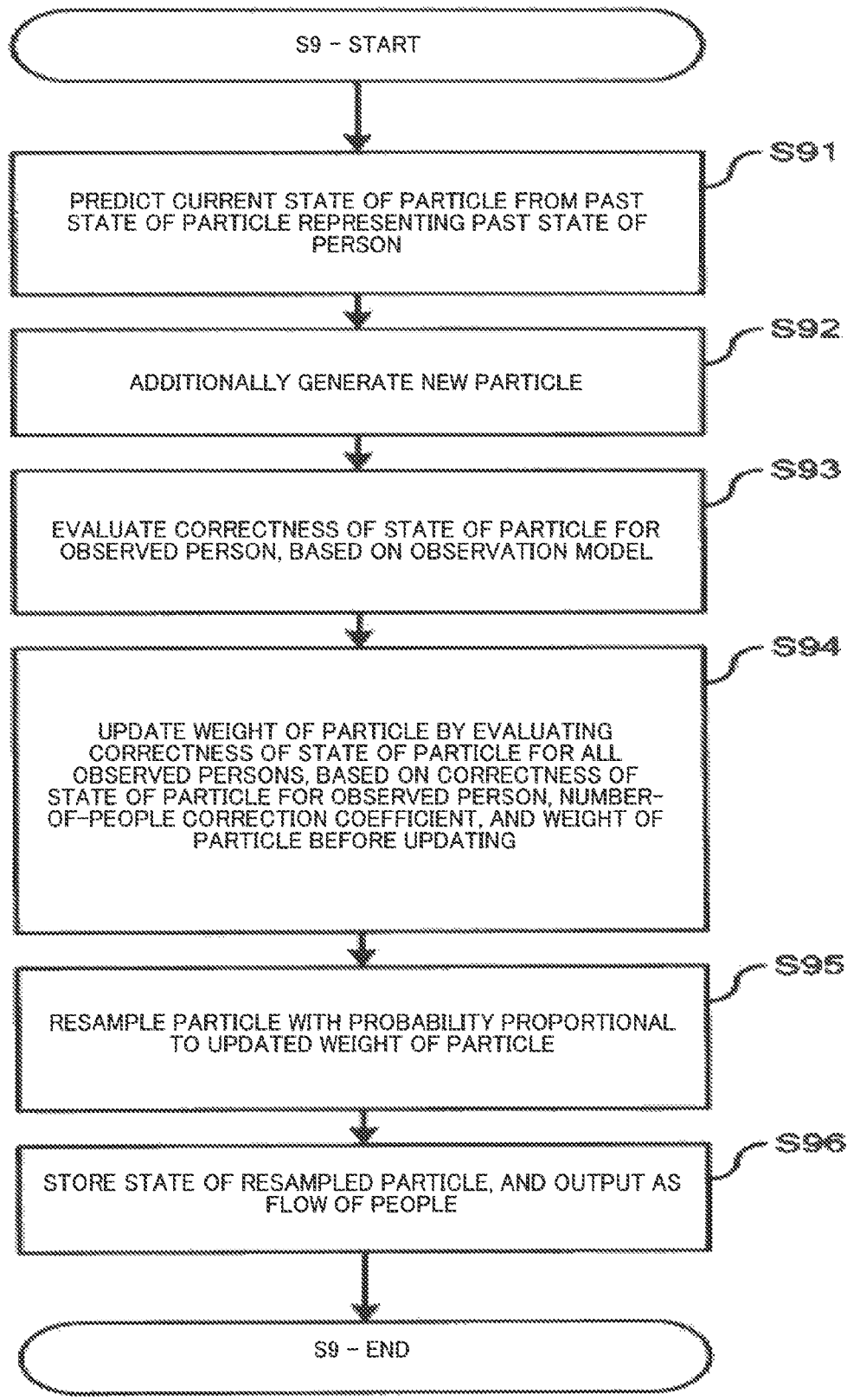
FIG. 5 is a flowchart illustrating an example of a processing progress of Step S9.

FIG. 5 is a flowchart illustrating an example of a processing progress of Step S9. The states-of-people prediction means 251 predicts a current state of a particle, based on a physical model, from a past state of a particle representing a past state of a person stored in the states-of-people storage means 32 (Step S91). The states-of-people prediction means 251 may predict a current state of a particle by calculation of the above-described Eq. (4). Next, the states-of-people prediction means 251 additionally generates a new particle (Step S92).

The states-of-people evaluation means 252 evaluates a probability of a state of a particle associated with an observed person, based on an observation model generated for each observed person (Step S93). In Step S93, the states-of-people evaluation means 252 may calculate an observation value from a state of a particle, and calculate a probability of the observation value by using the observation value and an observation model.

Next, the states-of-people updating means 253 updates a weight of a particle by evaluating a probability of a state of a particle for all observed persons, based on a value of a probability indicating a probability of a state of a particle associated with an observed person, which is calculated in Step S93, a number-of-people correction coefficient for each observed person, and a weight of a particle before updating (Step S94). The states-of-people updating means 253 performs the processing of Step S94 in a condition that a total number of persons within a partial area acquired by the number-of-people estimation means 21 and a total of updated weights of particles are made equal to each other. In Step S94, the states-of-people updating means 253 calculates a weight of a particle by calculation of Eq. (5), and updates a weight of the particle by a result of the calculation.

Next, the states-of-people updating means 253 resamples a particle with a probability proportional to a weight of a particle after updating (Step S95), and stores a state of a particle acquired as a result of the resampling in the states-of-people storage means 32, and outputs, as a flow of people, a position of a person indicated by the acquire state of the particle, a moving velocity of a person, and a number of persons (Step S96). Then, Step S9 is finished.

According to the present example embodiment, the number-of-people estimation means 21 estimates a number of persons within a partial area, based on image recognition by learning on the basis of a partial area. In learning on the basis of a partial area, learning is performed by including overlapping of persons. Therefore, estimation of a number of persons within a partial area by the number-of-people estimation means 21 is robust even in a crowded environment. Further, in the present example embodiment, a flow of people is estimated based on information being a number of persons within a partial area. Then, in the present example embodiment, processing of tracking by associating persons with one another among images is not performed. Therefore, it is possible to estimate a flow of people, even when overlapping of persons occurs in a crowded environment. Specifically, according to the present example embodiment, it is possible to estimate a flow of people even in a crowded environment.

Further, according to the present example embodiment, the observation model generation means 24 generates an observation model for each observed person; and the states-of-people estimation means 25 updates a weight of each particle by representing a state of a person by states of a plurality of respectively weighted particles, acquiring a probability of a state of each particle one by one by an observation model, and integrally evaluating a result of these probabilities. Therefore, according to the present example embodiment, even when there is a particle that is not associated with a state of a person, a weight of the particle is reduced. Thus, it is possible to appropriately evaluate a probability of a particle.

Second Example Embodiment

Figure 6:
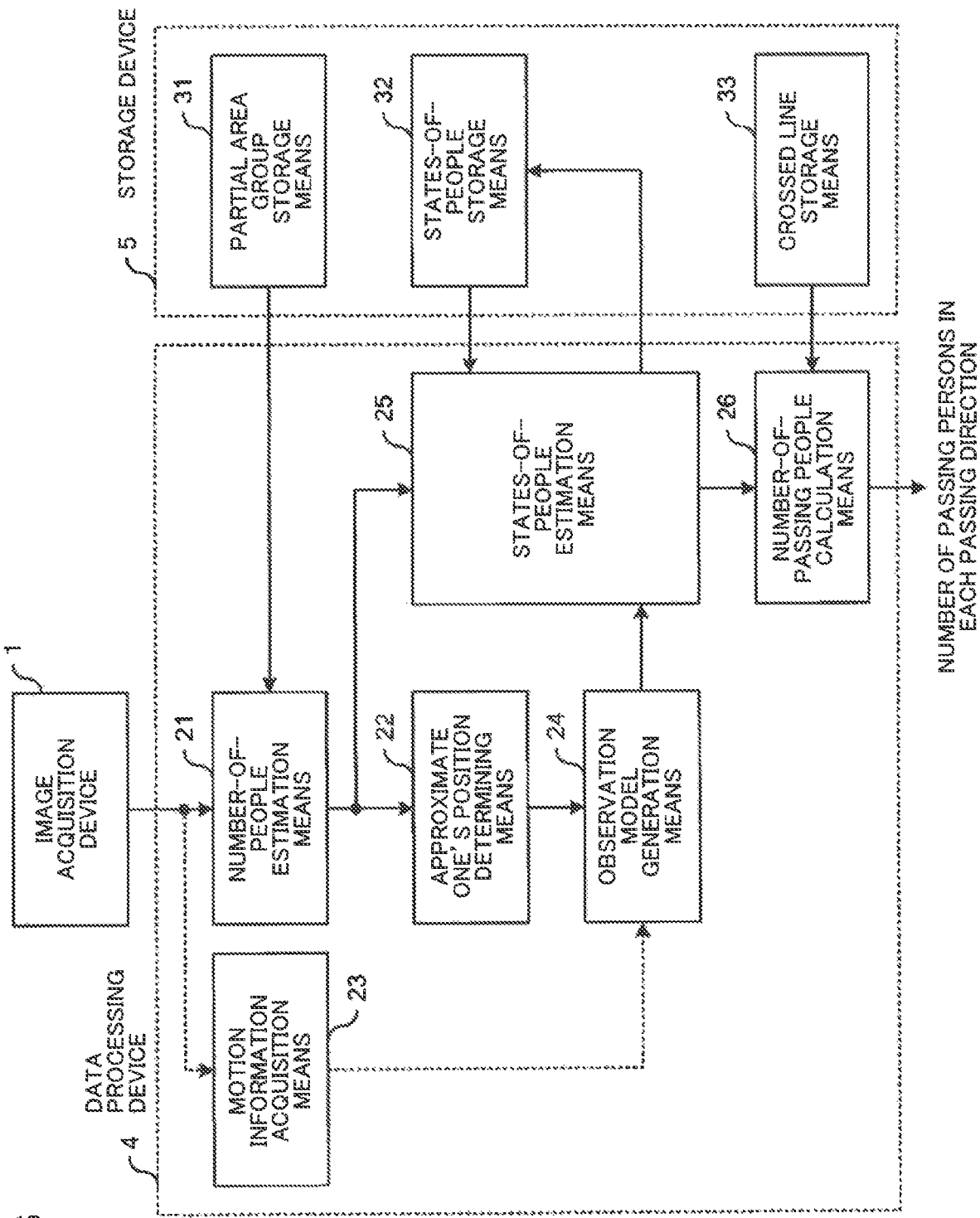
FIG. 6 is a block diagram illustrating a configuration example of a people flow estimation device in a second example embodiment of the present invention.

FIG. 6 is a block diagram illustrating a configuration example of a people flow estimation device in a second example embodiment of the present invention. Constituent elements similar to constituent elements in the first example embodiment are indicated with same reference numbers of the constituent elements illustrated in FIG. 1, and description thereof is omitted.

A storage device 5 in the second example embodiment includes a crossed line storage means 33, in addition to constituent elements included in the storage device 3 in the first example embodiment.

Further, a data processing device 4 in the second example embodiment includes a number-of-passing-people calculation means 26, in addition to constituent elements included in the data processing device 2 in the first example embodiment.

The crossed line storage means 33 stores coordinates of two points that define a crossed line. A crossed line is a line based on which a number of passing persons in each passing direction is calculated. A crossed line is determined in advance. A unit of coordinates of two points that define a crossed line may be determined depending on a position and a moving velocity of a particle to be acquired as a flow of people. When it is assumed that a position and a moving velocity of a particle are a position and a moving velocity on a real space plane simulating a ground, a unit of coordinates may also be determined depending on the position and the moving velocity. Further, when it is assumed that a position and a moving velocity of a particle are a position and a moving velocity on an image, a unit of coordinates may also be determined depending on the position and the moving velocity.

The number-of-passing-people calculation means 26 extracts a particle passing a crossed line in each passing direction, based on a current state of a particle output as a flow of people, a past position of a particle estimated from a state of the particle, a past state of a particle output as a flow of people at a previous time, and a current position of a particle estimated from a state of the particle; and calculates a number of passing persons in each passing direction by using a weight of an extracted particle.

Figure 7:
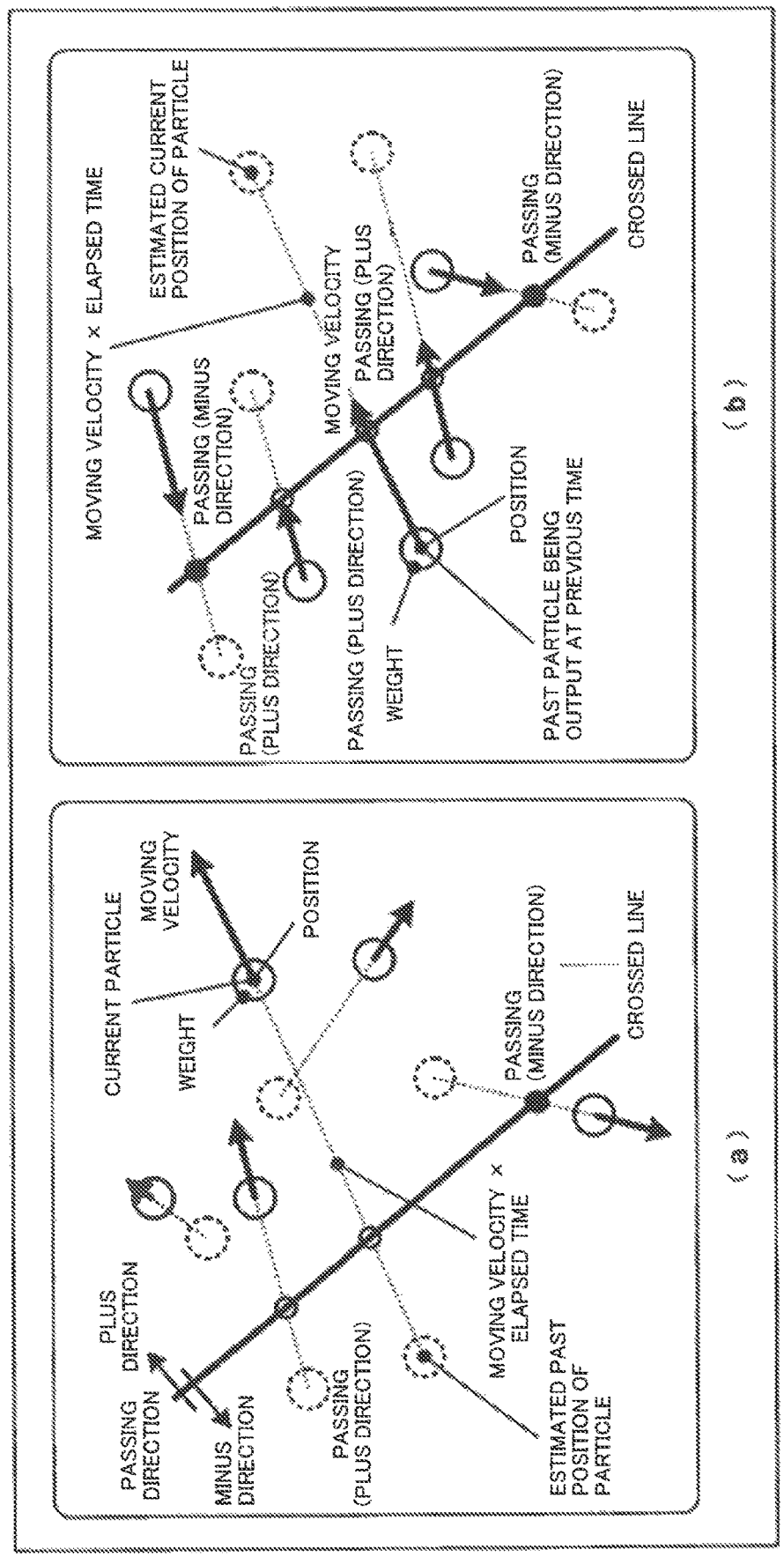
FIG. 7 is a schematic diagram illustrating an example of a positional relationship among current particles and past particles.

In the following, an operation of the number-of-passing people calculation means 26 is described more specifically with reference to FIG. 7. FIG. 7 is a schematic diagram illustrating an example of a positional relationship of particles between a current position and a past position. (a) in FIG. 7 illustrates current positions of particles, and past positions of particles estimated from states of the particles. In (a) of FIG. 7, each of current particles is illustrated by being surrounded by a solid-line circle, and each of estimated past particles is illustrated by being surrounded by a broken-line circle. Further, (b) in FIG. 7 illustrates past positions of particles output as a flow of people at a previous time, and current positions of particles estimated from states of the particles. In (b) of FIG. 7, each of past particles is illustrated by being surrounded by a solid-line circle, and each of estimated current particles is illustrated by being surrounded by a broken-line circle.

Further, the number-of-passing-people calculation means 26 estimates a past position of a particle and a current position of a particle by assuming that a particle performs uniform linear motion during an elapsed time (described as dt) from a time when a flow of people is output at a previous time until a current time.

A current state of a particle output as a flow of people indicates a position and a moving velocity of a current particle. The number-of-passing-people calculation means 26 estimates a past position of a particle from a current state of a particle by assuming that a particle performs uniform linear motion during an elapsed time dt. The number-of-passing-people calculation means 26 connects a current position of a particle and an estimated past position of a particle by a straight line, and extracts a particle passing a crossed line, based on whether or not the crossed line and the straight line intersect each other. Further, two types of passing directions (a plus direction and a minus direction) are determined in advance, as passing directions of a crossed line. For example, it is assumed that a passing direction from a certain side toward the other side with respect to a crossed line is a plus direction, and a passing direction opposite to the plus direction is a minus direction. The number-of-passing-people calculation means 26 extracts a particle passing a crossed line in each passing direction. For example, the number-of-passing-people calculation means 26 connects a current position of a particle and an estimated past position of a particle by a straight line. When a crossed line and the straight line intersect each other, and the past position of the particle is present on the above-described certain side, the number-of-passing-people calculation means 26 extracts the particle, as a particle passing the crossed line in the plus direction. Further, for example, the number-of-passing-people calculation means 26 connects a current position of a particle and an estimated past position of a particle by a straight line. When a crossed line and the straight line intersect each other, and the past position of the particle is present on the above-described other side, the number-of-passing-people calculation means 26 extracts the particle, as a particle passing the crossed line in the minus direction.

Further, the number-of-passing-people calculation means 26 sums weights of each particle extracted in each passing direction, in each passing direction. Specifically, the number-of-passing-people calculation means 26 respectively calculates a total of weights of particles passing a crossed line in the plus direction, and a total of weights of particles passing the crossed line in the minus direction. The number-of-passing-people calculation means 26 calculates a number of persons passing a crossed line in each passing direction, based on each total value. Specifically, the number-of-passing-people calculation means 26 calculates a number of persons passing a crossed line in the plus direction, based on a total value of weights of particles passing the crossed line in the plus direction; and calculates a number of persons passing the crossed line in the minus direction, based on a total value of weights of particles passing the crossed line in the minus direction.

Likewise, the number-of-passing-people calculation means 26 predicts a current position of a particle from a past state of a particle output as a flow of people at a previous time by assuming that a particle performs uniform linear motion during an elapsed time dt. Then, the number-of-passing-people calculation means 26 extracts a particle passing a crossed line in each passing direction similarly to the above-described case. For example, the number-of-passing-people calculation means 26 connects a past position of a particle and an estimated current position of a particle by a straight line. When a crossed line and the straight line intersect each other, and the past position of the particle is present on the above-described certain side, the number-of-passing-people calculation means 26 extracts the particle, as a particle passing the crossed line in the plus direction. Further, for example, the number-of-passing-people calculation means 26 connects a past position of a particle and a predicted current position of a particle by a straight line. When a crossed line and the straight line intersect each other, and the past position of the particle is present on the above-described other side, the number-of-passing-people calculation means 26 extracts the particle, as a particle passing the crossed line in the minus direction.

Further, similarly to the above-described case, the number-of-passing-people calculation means 26 sums weights of particles extracted in each passing direction, in each passing direction, and calculates a number of persons passing a crossed line in each passing direction, based on each total value. Specifically, the number-of-passing-people calculation means 26 respectively calculates a total of weights of particles passing a crossed line in the plus direction, and a total of weights of particles passing the crossed line in the minus direction. Then, the number-of-passing-people calculation means 26 calculates a number of persons passing the crossed line in the plus direction, based on a total value of weights of particles passing the crossed line in the plus direction; and calculates a number of persons passing the crossed line in the minus direction, based on a total value of weights of particles passing the crossed line in the minus direction.

As a result of the calculation, it is possible to acquire a number of persons passing a crossed line in the plus direction and a number of persons passing the crossed line in the minus direction, which are calculated by estimating a past position of a particle from a current state of a particle; and a number of persons passing the crossed line in the plus direction and a number of persons passing the crossed line in the minus direction, which are calculated by predicting a current position of a particle from a past state of a particle.

The number-of-passing-people calculation means 26 calculates an average value of a number of persons passing a crossed line in the plus direction, which is calculated by estimating a past position of a particle from a current state of the particle, and a number of persons passing the crossed line in the plus direction, which is calculated by predicting a current position of a particle from a past state of the particle; and determines the average value, as a number of persons passing the crossed line in the plus direction. Likewise, the number-of-passing-people calculation means 26 calculates an average value of a number of persons passing the crossed line in the minus direction, which is calculated by estimating a past position of a particle from a current state of the particle, and a number of persons passing the crossed line in the minus direction, which is calculated by estimating a current position of a particle from a past state of the particle; and determines the average value, as a number of persons passing the crossed line in the minus direction. The number-of-passing-people calculation means 26 outputs a number of passing persons in each passing direction.

In the above-described example, a case is described in which the number-of-passing-people calculation means 26 calculates numbers of passing persons in the plus direction and in the minus direction by two methods; and acquires an average value of the numbers of passing persons in the plus direction calculated by the two methods, and an average value of the numbers of passing persons in the minus direction calculated by the two methods. The number-of-passing-people calculation means 26 may calculate a number of passing persons in the plus direction and a number of passing persons in the minus direction only by either one of the method for estimating a past position of a particle from a current state of a particle, and the method for predicting a current position of a particle from a past state of a particle.

Further, the crossed line storage means 33 may determine a plurality of crossed lines. When a plurality of crossed lines are determined, the number-of-passing-people calculation means 26 may calculate a number of passing persons in the plus direction and a number of passing persons in the minus direction for each crossed line.

Further, a method for calculating a number of passing persons in each passing direction by the number-of-passing-people calculation means 26 is not limited to the above-described examples. For example, the number-of-passing-people calculation means 26 may calculate a number of persons passing a crossed line in each passing direction, based on a current state of a particle output as a flow of people, and a past state of a particle used for prediction by Eq. (4) by the states-of-people prediction means 251. Specific processing in this case is described in the following.

The number-of-passing-people calculation means 26 specifies a current state of a particle output as a flow of people, and specifies a past state of a particle used for predicting a state of the particle by Eq. (4). Then, the number-of-passing-people calculation means 26 connects a current position of a particle and an associated past position of a particle by a straight line. When a crossed line and the straight line intersect each other, and the past position of the particle is present on the above-described certain side, the number-of-passing-people calculation means 26 extracts the particle, as a particle passing the crossed line in the plus direction. Further, the number-of-passing-people calculation means 26 connects a current position of a particle and a past position of an associated particle by a straight line. When a crossed line and the straight line intersect each other, and the past position of the particle is present on the above-described other side, the number-of-passing-people calculation means 26 extracts the particle, as a particle passing the crossed line in the minus direction. Then, the number-of-passing-people calculation means 26 respectively calculates a total of weights of particles passing the crossed line in the plus direction, and a total of weights of particles passing the crossed line in the minus direction. Further, the number-of-passing-people calculation means 26 calculates a number of persons passing the crossed line in the plus direction, based on a total value of weights of particles passing the crossed line in the plus direction; and calculates a number of persons passing the crossed line in the minus direction, based on a total value of weights of particles passing the crossed line in the minus direction.

However, when a current particle is a newly added particle, a past state of a particle associated with the particle is not acquired. Therefore, when a current particle is a newly added particle, the number-of-passing-people calculation means 26 eliminates the particle from a target to be extracted.

Further, the number-of-passing-people calculation means 26 may calculate a number of passing persons in each passing direction by a plurality of methods, and integrate the numbers of passing persons calculated by the plurality of methods in each passing direction.

The number-of-passing-people calculation means 26 is implemented by a CPU of a computer operated in accordance with a people flow estimation program.

Also in the second example embodiment, an advantageous effect similar to the first example embodiment is acquired.

Further, in the second example embodiment, similar to the first example embodiment, information on particles corresponding to a flow of people is acquired, based on a number of persons within a partial area to be acquired robustly even in a crowed environment. Further, processing of tracking by associating persons with one another among images is not performed. Then, the number-of-passing-people calculation means 26 calculates a number of persons passing a crossed line in each passing direction from the information on particles. Therefore, even in a crowded environment in which overlapping of persons occurs, it is possible to appropriately calculate a number of persons passing a crossed line in each passing direction.

Third Example Embodiment

Figure 8:
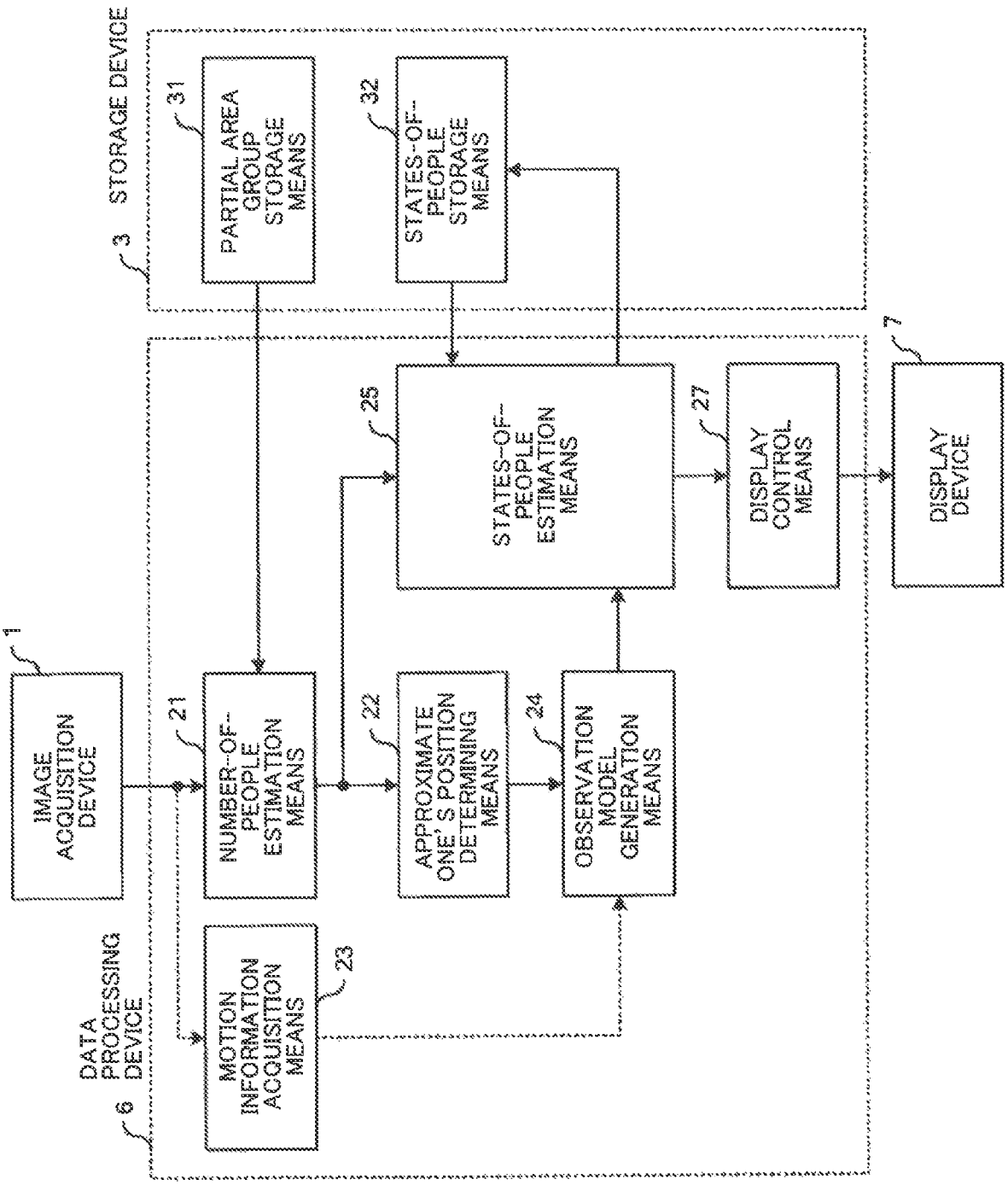
FIG. 8 is a block diagram illustrating a configuration example of a people flow estimation device in a third example embodiment of the present invention.

FIG. 8 is a block diagram illustrating a configuration example of a people flow estimation device in a third example embodiment of the present invention. Constituent elements similar to constituent elements in the first example embodiment are indicated with same reference numbers as the constituent elements illustrated in FIG. 1, and description thereof is omitted.

A people flow estimation device in the third example embodiment includes a display device 7, in addition to an image acquisition device 1, a data processing device 6, and a storage device 3. The display device 7 is implemented by a liquid crystal display device, or the like, for example.

Further, the data processing device 6 in the third example embodiment includes a display control means 27, in addition to constituent elements included in the data processing device 2 in the first example embodiment.

The display control means 27 displays, on the display device 7, a particle indicating a position of a person, a moving velocity of a person, and a number (weight) of persons. Hereinafter, a figure to be displayed on the display device 7 as a figure representing a particle may be described as an object. In the following, various display examples of an object representing a particle are described.

First Display Example

Figure 9:
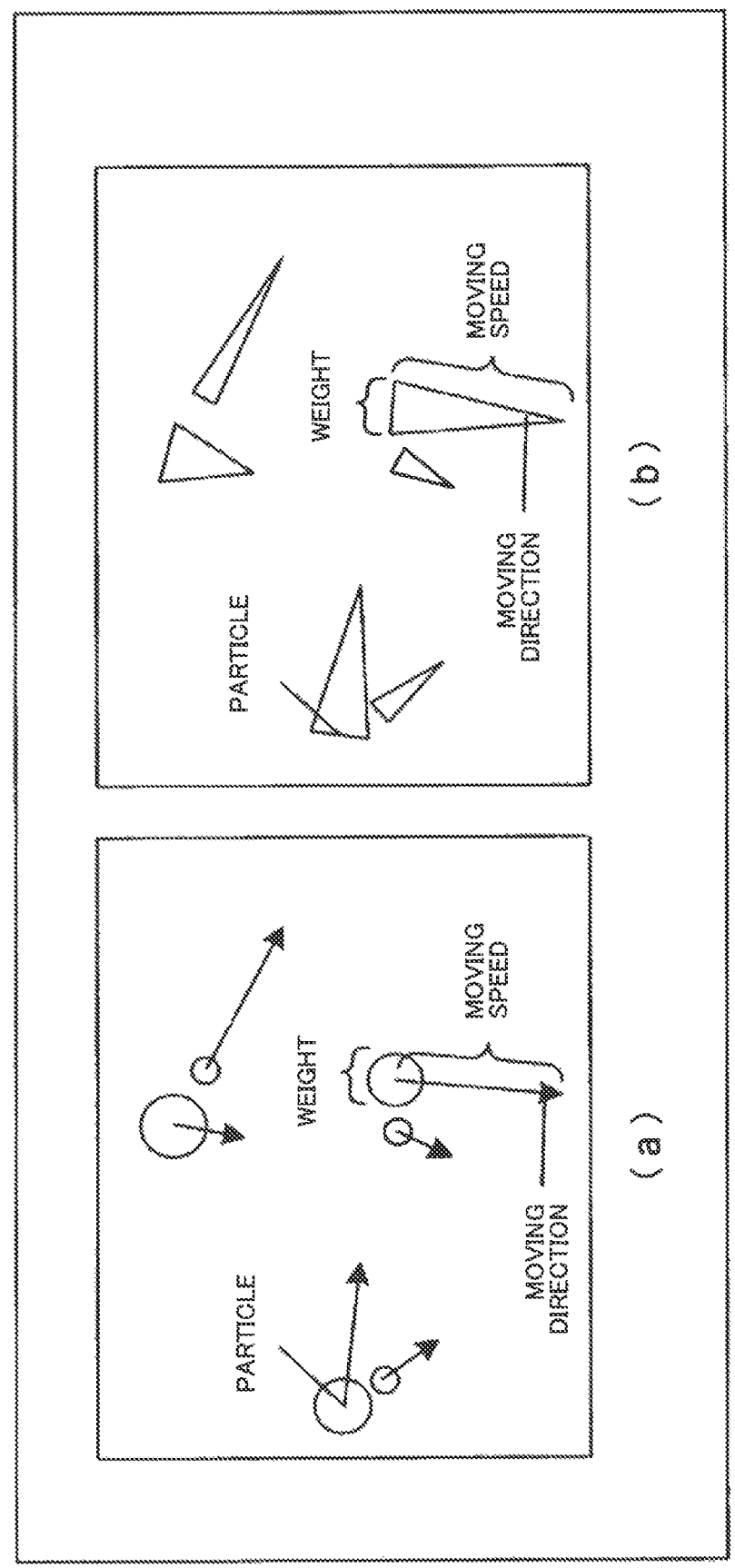
FIG. 9 is a schematic diagram illustrating a display example, when individual particles after merge processing are respectively displayed as objects.

The display control means 27 merges all particles among which a combination of a position, a moving velocity and a weight of a person is totally the same into one particle. At this occasion, the display control means 27 determines, as a weight of one particle after merging, a total of weights of each particle to be merged. The display control means 27 performs the merge processing for all particles. The display control means 27 respectively displays individual particles after the merge processing as objects on the display device 7. FIG. 9 is a schematic diagram illustrating a display example in a case where the display control means 27 respectively displays individual particles after merge processing as objects. (a) in FIG. 9 illustrates a display example in a case where an object is a combination of a circle and an arrow, and (b) in FIG. 9 illustrates an example of a case where an object is an isosceles triangle.

A case where the display control means 27 displays a particle after merge processing, as a combination of a circle and an arrow, is described with reference to (a) in FIG. 9. The display control means 27 displays a circle by aligning a center of the circle with a position of a particle. At this occasion, the display control means 27 displays the circle by determining a radius of the circle depending on a weight of the particle. The display control means 27 may increase a radius of the circle, as a value of the weight increases. Further, the display control means 27 displays an arrow by aligning a start point of the arrow with the position of the particle. The arrow represents a moving velocity indicated by the particle. The display control means 27 aligns a direction of the arrow with a moving direction of the particle, and displays the arrow by determining a length of the arrow depending on a speed of the moving velocity. The display control means 27 may increase the length of the arrow, as a value of the speed increases. Note that, a start point of an arrow indicates an end portion of the arrow opposite to an arrowhead.

A case where a particle after merge processing is displayed as an isosceles triangle is described with reference to (b) in FIG. 9. The display control means 27 displays an isosceles triangle by aligning a midpoint of a base side of the isosceles triangle with a position of a particle. At this occasion, the display control means 27 determines a length of the base side of the isosceles triangle depending on a weight of the particle. The display control means 27 may increase the length of the base side, as a value of the weight increases. Further, the display control means 27 aligns a direction of a vertex of the isosceles triangle with a direction of a moving velocity indicated by the particle. Further, the display control means 27 determines a distance from the base side to the vertex of the isosceles triangle depending on a speed of the moving velocity. The display control means 27 may increase the distance from the base side to the vertex, as a value of the speed increases. The display control means 27 displays the isosceles triangle, after determining a shape of the isosceles triangle as described above. Herein, a vertex of an isosceles triangle is a vertex commonly shared by equal sides of the isosceles triangle.

Herein, a case where an object is a combination of a circle and an arrow, or an isosceles triangle is exemplified. As far as an object is able to represent a position, a moving velocity (a direction and a speed), and a weight of a particle, the object may be other than a combination of a circle and an arrow, or an isosceles triangle. For example, as far as it is possible to represent a position of a particle by a position of an object, represent a weight of a particle by a size or a width of an object, and represent a moving direction and a speed of a particle by an orientation and a length of an object, it is possible to apply an object other than the above-described examples to the first display example.

Further, the display control means 27 may use only a particle whose weight is larger than a predetermined value, as a target to be displayed. In this case, the display control means 27 is able to display an important particle in an emphasized manner.

Second Display Example

Figure 10:
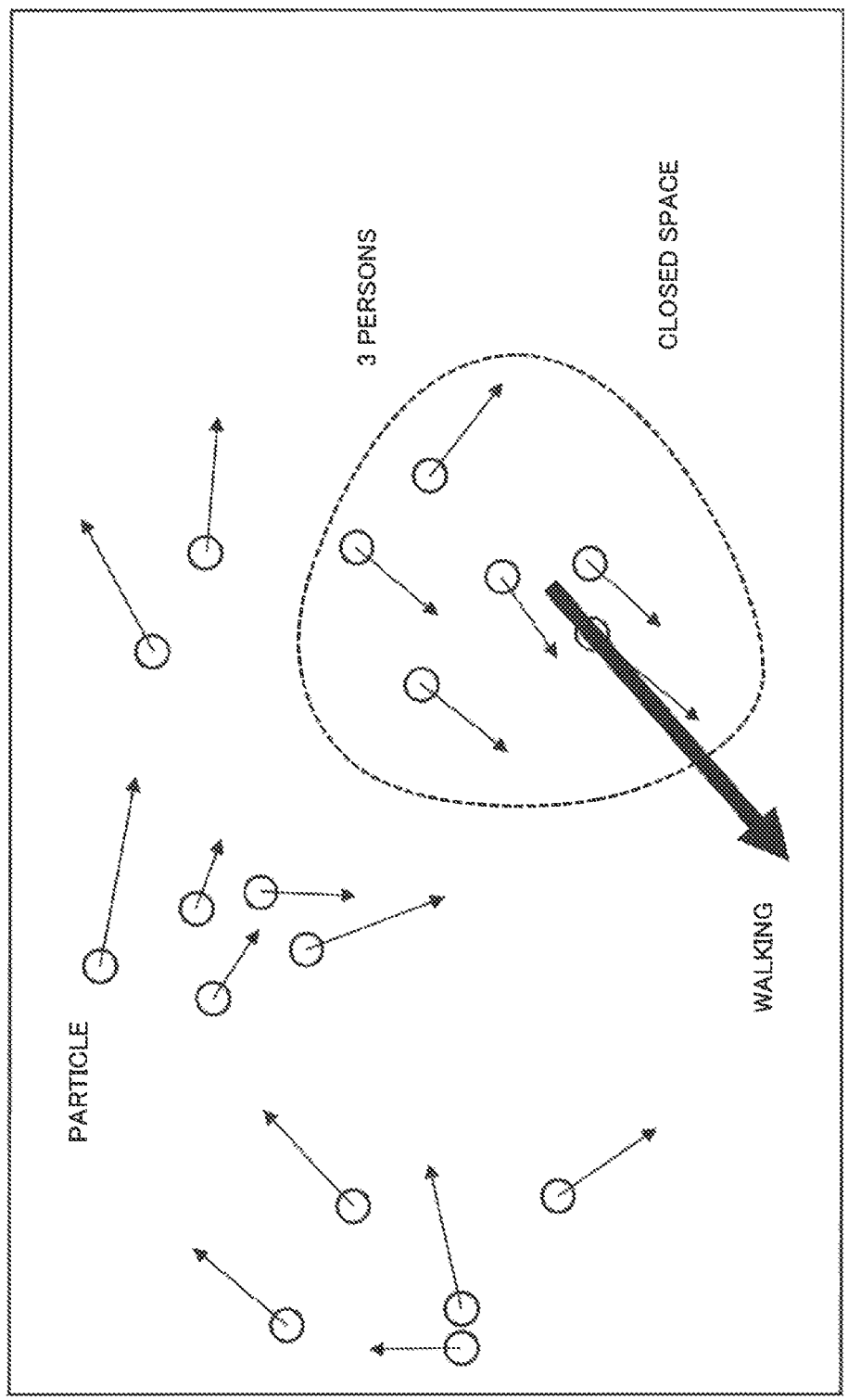
FIG. 10 is a schematic diagram illustrating a display pattern of particles in a second display example.

FIG. 10 is a schematic diagram illustrating a display pattern of particles in a second display example. The display control means 27 receives setting of a closed space on a screen or on a real space plane from the outside via a user interface. A user who sets a closed space sets the closed space in such a way that a part of particles are surrounded. Note that, not a user but an external system or the like may set a closed space.

When a closed space is set, the display control means 27 calculates a total of weights of particles within the closed space, and calculates a number of persons within the closed space from the total of weights. Further, the display control means 27 calculates a representative velocity (moving velocity serving as a representative) from moving velocities of particles within the closed space. For example, the display control means 27 acquires a representative velocity, based on an average value or a most frequent value of moving velocities of particles, or the like. Then, as exemplified in FIG. 10, the display control means 27 displays, on the display device 7, a set closed space, a calculated number of persons within the closed space, and an arrow representing the above-described representative velocity. The display control means 27 displays a number of persons within the closed space at a position near the closed space, for example. FIG. 10 exemplifies a case where a number of persons being "3 persons" within a closed space is displayed. Further, the display control means 27 determines a length of an arrow associated with a representative velocity, aligns a direction of the arrow with an orientation of the representative velocity, and displays the arrow by aligning a start point of the arrow with a center of the closed space. Furthermore, the display control means 27 displays, on the display device 7, a numerical value or a phrase associated with the representative velocity. An example of a numerical value associated with a speed is "120 cm/sec" or the like, for example. In this case, the display control means 27 may display by appending a unit to a representative velocity. Further, examples of a phrase associated with a speed are "staying", "walking", "running". "speed: intermediate", and the like, for example. When a phrase is displayed, the display control means 27 may store a correlation between a range of speeds and a phrase, select a phrase associated with a representative velocity, and display the phrase on the display device 7. FIG. 10 exemplifies a case where a phrase "walking" is displayed. Note that a phrase to be displayed is not limited to the above-described example.

Further, in the second display example, the display control means 27 may display an object indicating a position, a moving velocity, and a weight of a particle in an overlapping manner. FIG. 10 exemplifies a case where a combination of a circle and an arrow is displayed for each particle.

Third Display Example

Figure 11:
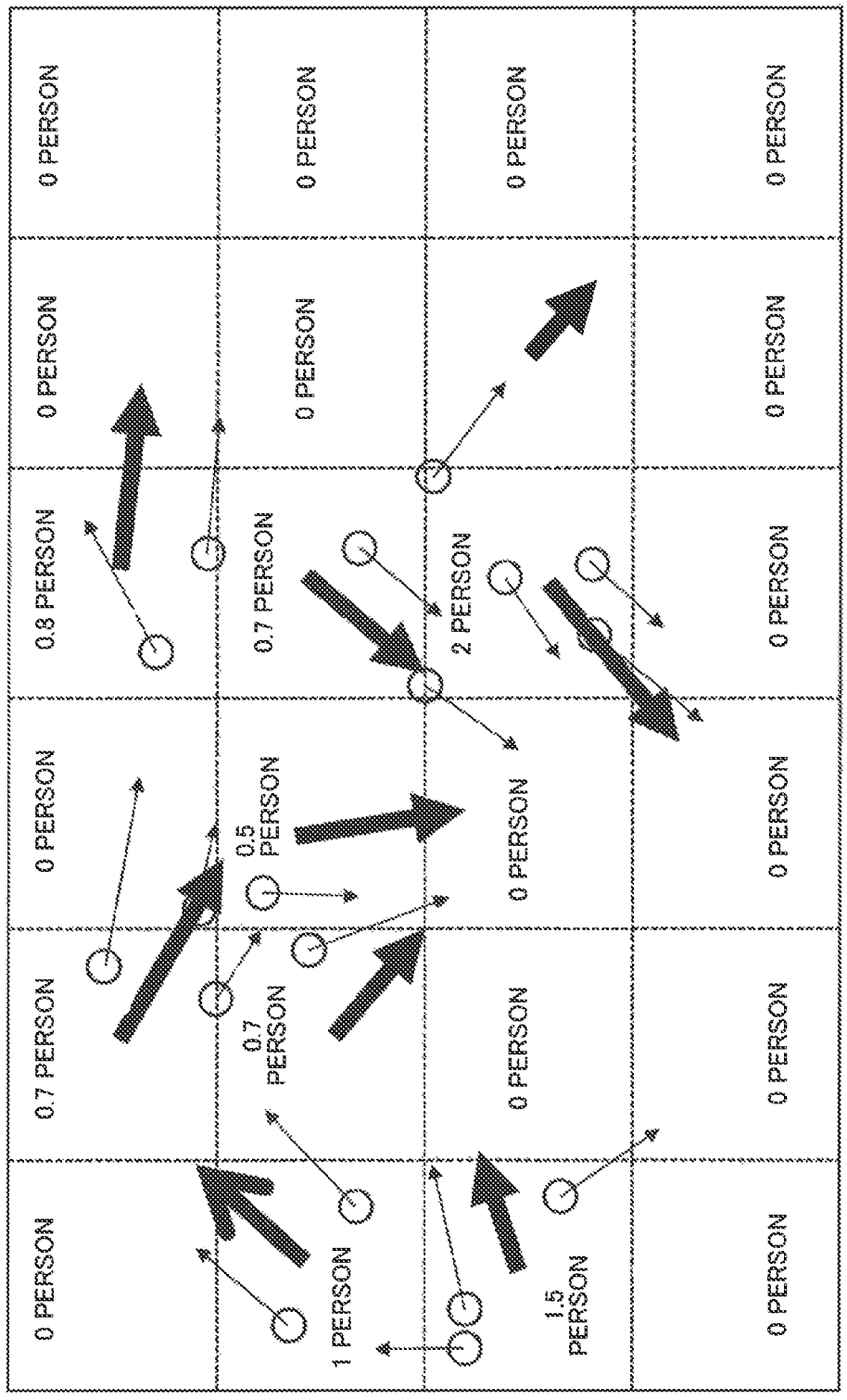
FIG. 11 is a schematic diagram illustrating a display pattern of particles in a third display example.

FIG. 11 is a schematic diagram illustrating a display pattern of particles in a third display example. In the present example, a plurality of closed spaces of a grid shape are set in advance on an image or a real space plane (see FIG. 11). The display control means 27 calculates a total of weights of particles within the closed space, for each closed space, and acquires a number of persons within the closed space from the total of weights. The display control means 27 calculates a representative velocity (moving velocity serving as a representative) from moving velocities of particles within the closed space by employing a closed space in which a calculated number of persons is larger than "0", as a target. For example, the display control means 27 acquires a representative velocity, based on an average value or a most frequent value of moving velocities of particles, or the like. The display control means 27 displays, on the display device 7, each closed space of a grid shape, and a number of persons calculated for each closed space. Further, the display control means 27 also displays, on the display device 7, an arrow representing the calculated representative velocity in the closed space in which a calculated number of persons is larger than "0" (see FIG. 11). At this occasion, similarly to the second display example, the display control means 27 may determine a length of the arrow associated with the representative velocity, align a direction of the arrow with an orientation of the representative velocity, and display the arrow by aligning a start point of the arrow with a center of the closed space.

Further, similarly to the second display example, the display control means 27 may display an object indicating a position, a moving velocity, and a weight of a particle in an overlapping manner.

Fourth Display Example

Figure 12:
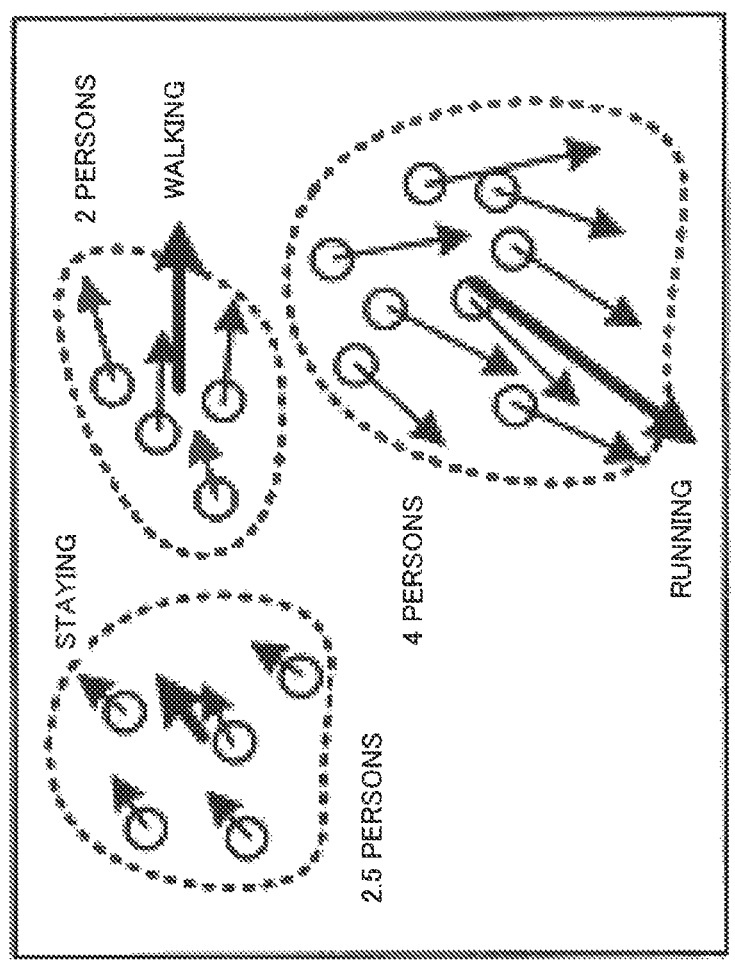
FIG. 12 is a schematic diagram illustrating a display pattern of particles in a fourth display example.

FIG. 12 is a schematic diagram illustrating a display pattern of particles in a fourth display example. In the present example, the display control means 27 performs clustering of particles, and sets a closed space for surrounding particles belonging to a same cluster. A clustering pattern is not specifically limited. For example, the display control means 27 may perform clustering of particles, based on a position of a particle. Further, for example, the display control means 27 may perform clustering of particles, based on a position and a direction of a moving velocity of a particle. Furthermore, for example, the display control means 27 may perform clustering of particles, based on a position and a moving velocity of a particle. Moreover, for example, the display control means 27 may perform clustering of particles, based on a position and a moving velocity of a particle.

Then, the display control means 27 may perform an operation similar to the second display example, for each closed space. Specifically, the display control means 27 calculates a total of weights of particles within a closed space, for each closed space, and acquires a number of persons within the closed space from the total of weights. Further, the display control means 27 calculates a representative velocity (moving velocity serving as a representative) from moving velocities of particles within the closed space, for each closed space. Then, the display control means 27 displays, on the display device 7, a closed space, a calculated number of persons within the closed space, an arrow representing the above-described representative velocity, and a numerical value or a phrase associated with the representative velocity, for each closed space (see FIG. 12). A method for determining an arrow is similar to the second display example. Further, a method for determining a numerical value or a phrase associated with a representative velocity is also similar to the second display example.

Further, similarly to the second display example, the display control means 27 may display a position, a moving velocity, and a weight of a particle in an overlapping manner.

In the above-described first to fourth display examples, the display control means 27 may change a color of an object, based on at least one of a direction and a speed of a moving velocity of a particle serving as a base of the object, and a weight of the particle. Further, in the above-described first to fourth display examples, the display control means 27 may display an object or the like on an image or a map acquired by the image acquisition device 1 in an overlapping manner. Furthermore, the display control means 27 may bring inside of a closed space to a translucent state, and change a color of the inside of the closed space, based on at least one of a number of persons within the closed space, and a direction and a speed of a representative velocity. Moreover, in the above-described first to fourth display examples, the display control means 27 may project and display an object on a real space plane onto an image by using a camera parameter of an imaging device and a real height.

Further, in a display example (second to fourth display examples) employing a closed space, the display control means 27 may display an avatar that matches an appearance manner of an image at a position of an object. At this occasion, the display control means 27 may align an orientation of the avatar with a direction of a moving velocity of a particle serving as a base of the object. Further, the display control means 27 may change a shape of the avatar depending on the moving velocity of the particle serving as a base of the object. For example, when a speed is a speed when an object is staying, the display control means 27 may display an avatar of an upright shape. Further, for example, when a speed is a speed when an object is walking, the display control means 27 may display an avatar of a walking shape. Furthermore, for example, when a speed is a speed when an object is running, an avatar of a running shape may be displayed. As far as a shape is associated with a speed, a shape of an avatar is not limited.

Further, the display control means 27 may display an avatar by adjusting a number of avatars depending on a number of persons represented by objects. Further, when a number of persons is numbers including a decimal point, one avatar is regarded as "1", and the display control means 27 may display each avatar by painting an entirety of each avatar associated with an integer part in black, and painting an area of one avatar associated with a value of a decimal part in black.

Figure 13:
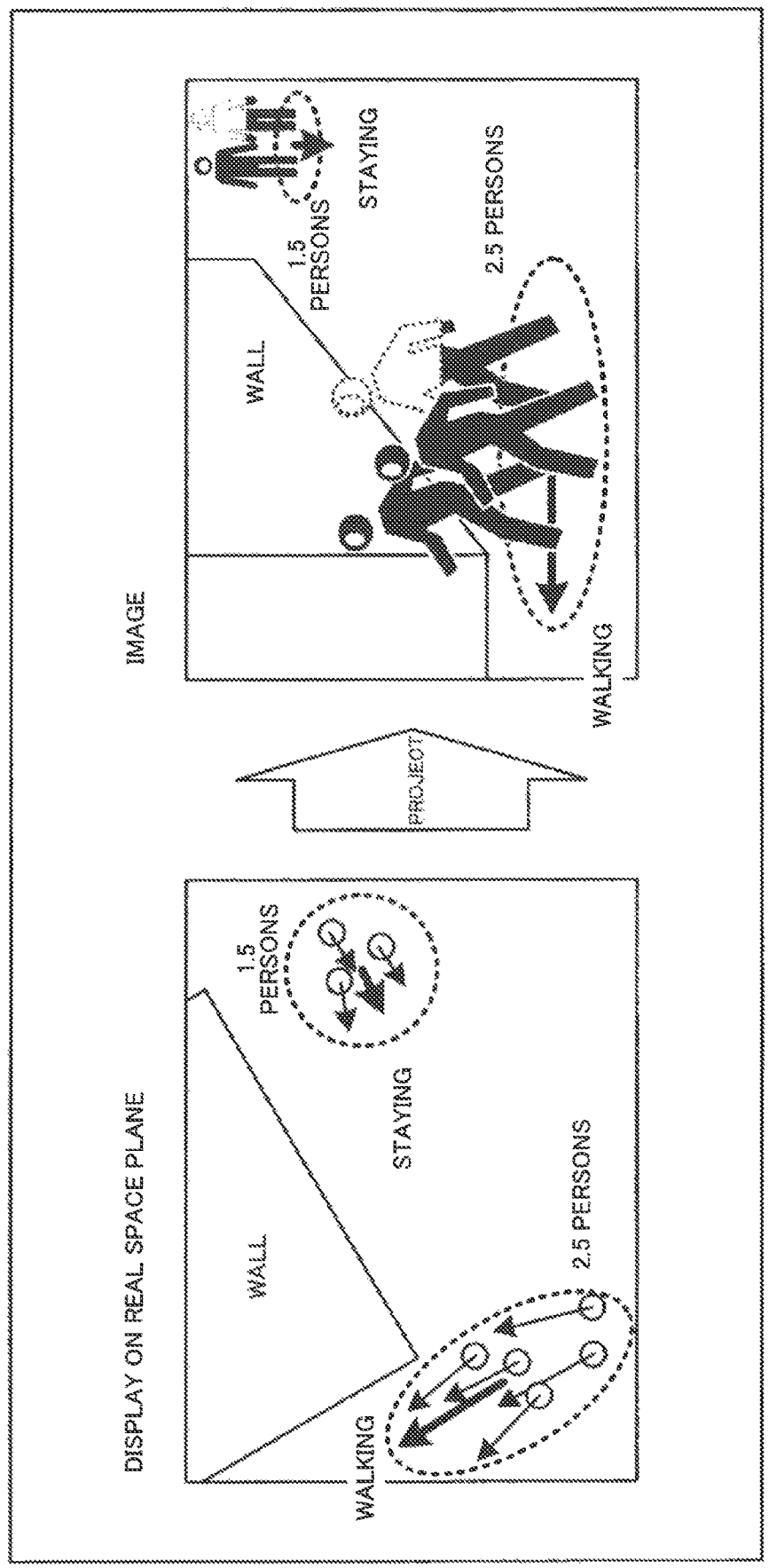
FIG. 13 is a schematic diagram illustrating a display example of avatars.

FIG. 13 is a schematic diagram illustrating a display example of avatars. FIG. 13 exemplifies a case where the display control means 27 projects an object relating to a closed space on a real space plane onto an image, and displays avatars representing persons on the projected object.

Further, in a display example (first display example) in which a closed space is not employed, the display control means 27 may display a pin-shaped avatar that matches an appearance manner of an image at a position of an object. The pin-shaped avatar is an avatar mimicking a person, and is an avatar capable of determining an orientation. Note that the avatar is not limited to a pin-shape. The display control means 27 may align an orientation of a pin-shaped avatar with a direction of a moving velocity of a particle serving as a base of an object. Further, the display control means 27 may change a shape of a pin-shaped avatar depending on a value of a weight of a particle serving as a base of an object. For example, the display control means 27 may change a thickness, a size, or a height of a pin-shaped avatar depending on a value of a weight. Herein, a case where a thickness, a size, or a height is changed is exemplified. The display control means 27 may change a shape of an avatar by another pattern.

Figure 14:
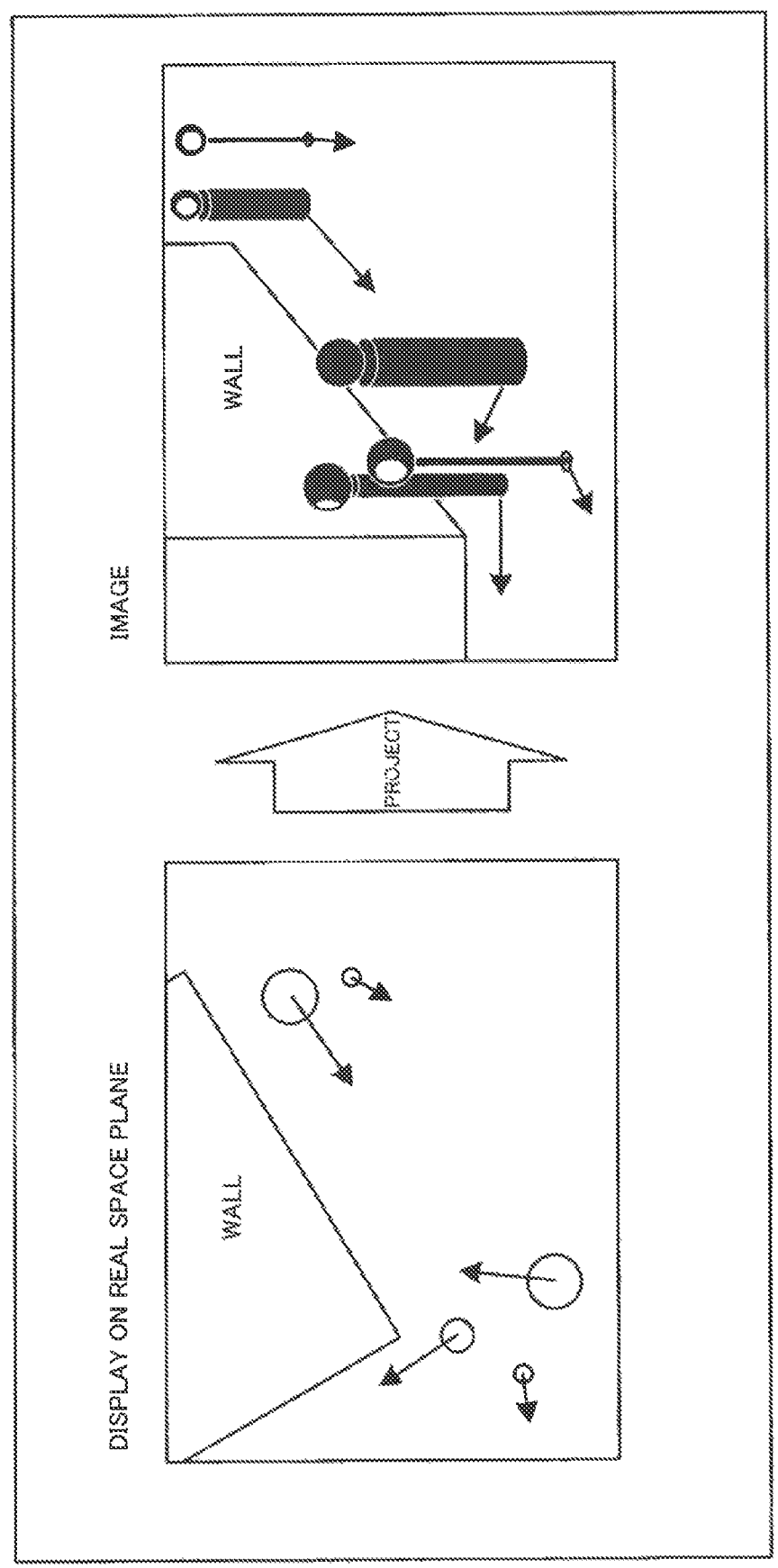
FIG. 14 is a schematic diagram illustrating a display example of pin-shaped avatars.

FIG. 14 is a schematic diagram illustrating a display example of a pin-shaped avatar. FIG. 14 exemplifies a case where the display control means 27 projects an object on a real space plane onto an image, and displays pin-shaped avatars on the projected object.

The display control means 27 is implemented by a CPU of a computer operated in accordance with a people flow estimation program, for example.

Also in the third example embodiment, an advantageous effect similar to the first example embodiment is acquired.

Further, in the third example embodiment, a visually emphasized object is displayed depending on a position, a moving velocity, and a weight indicated by a state of a particle. Therefore, a user is allowed to intuitively understand a state of an entirety of a flow of people on a screen of the display device 7.

Further, in the third example embodiment, particles are classified into meaningful group units. For example, particles are merged, or a group of particles is determined by a closed space. Then, the display control means 27 displays a condition on a flow of people of a representative of a group, as an object. Thus, since a flow of people is emphasized in terms of a unit whose meaning is easily understood, a user is allowed to more clearly understand a state of a flow of people.

Further, a people flow estimation device may include both of a function of the second example embodiment, and a function of the third example embodiment. For example, in a people flow estimation device in the third example embodiment (see FIG. 8), the storage device 3 may include the crossed line storage means 33 (see FIG. 6) in the second example embodiment, and the data processing device 6 may include the number-of-passing people calculation means 26 (see FIG. 6) in the second example embodiment.

Figure 15:
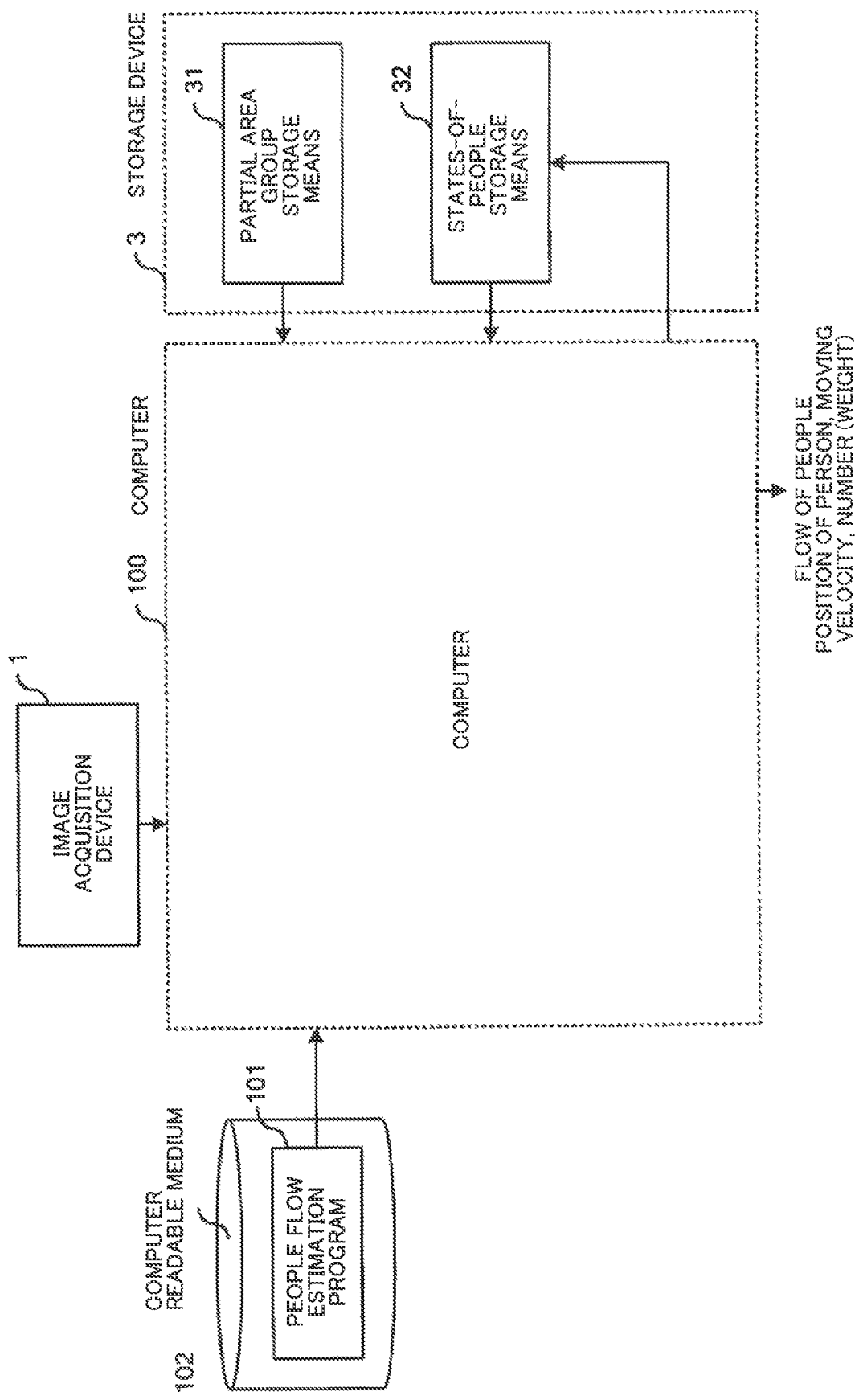
FIG. 15 is a block diagram illustrating a specific configuration example of the present invention.

FIG. 15 is a block diagram illustrating a specific configuration example of the present example embodiment. As illustrated in FIG. 15, a people flow estimation device in the present example embodiment includes an image acquisition device 1, a storage device 3, a computer 100, and a computer readable medium 102. The storage device 3 includes a partial area group storage means 31 and a states-of-people storage means 32. The computer readable medium 102 stores a people flow estimation program 101.

The computer 100 is connected to the image acquisition device 1, the storage device 3, and the computer readable medium 102.

The computer readable medium 102 is a storage device such as a magnetic disk and a semiconductor memory, for example.

The computer 100 reads the people flow estimation program 101 from the computer readable medium 102 when the computer 100 is activated, for example, and is operated as a data processing device described in each example embodiment in accordance with the people flow estimation program 101.

For example, the computer 100 is operated as the data processing device 2 in the first example embodiment (the number-of-people estimation means 21, the approximate one's position determining means 22, the motion information acquisition means 23, the observation model generation means 24, and the states-of-people estimation means 25) in accordance with the people flow estimation program 101.

Further, for example, the computer 100 may be operated as the data processing device 4 in the second example embodiment (the number-of-people estimation means 21, the approximate one's position determining means 22, the motion information acquisition means 23, the observation model generation means 24, the states-of-people estimation means 25, and the number-of-passing people calculation means 26) in accordance with the people flow estimation program 101. In this case, the storage device 3 illustrated in FIG. 15 may be configured to include the crossed line storage means 33.

Further, for example, the computer 100 may be operated as the data processing device 6 in the third example embodiment (the number-of-people estimation means 21, the approximate one's position determining means 22, the motion information acquisition means 23, the observation model generation means 24, the states-of-people estimation means 25, and the display control means 27) in accordance with the people flow estimation program 101. In this case, a people flow estimation device may include the display device 7 (see FIG. 8), and may be configured in such a way that the display device 7 is connected to the computer 100.

Further, a people flow estimation device in each example embodiment of the present invention may be configured in such a way that the image acquisition device 1, the computer 100, the storage device 3, and the computer readable medium 102 are provided in an internet protocol (IP) camera. The image acquisition device 1 acquires an image from an IP camera. It can be said that this configuration is a configuration in which an IP camera itself estimates a flow of people. Note that, when processing of the third example embodiment is performed in this configuration, the display device 7 (see FIG. 8) may be connected to the computer 100.

Figure 16:
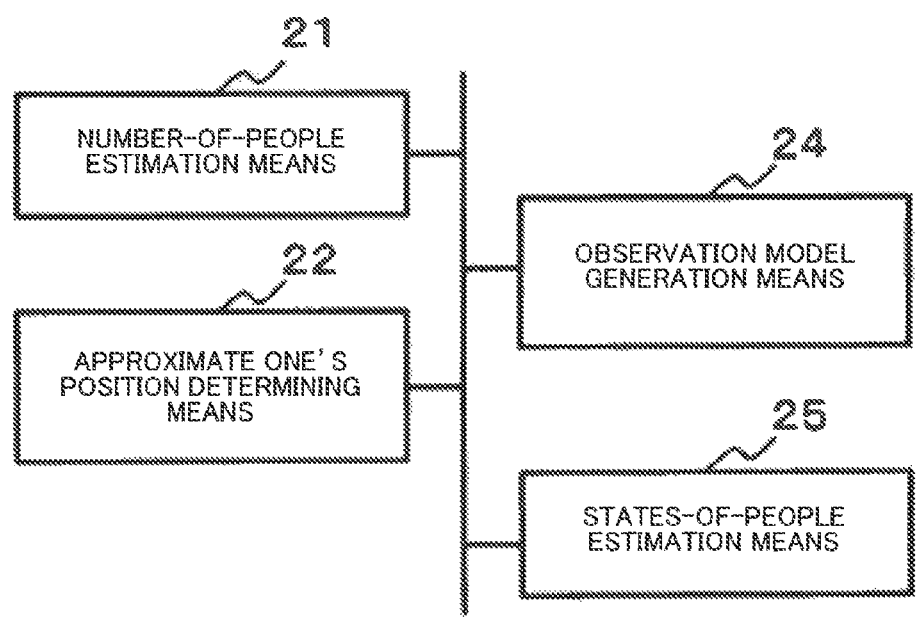
FIG. 16 is a schematic diagram illustrating an overview of the present invention.

Next, an overview of the present example embodiment is described. FIG. 16 is a schematic diagram illustrating an overview of the present example embodiment. A people flow estimation device in the present example embodiment includes the number-of-people estimation means 21, the approximate one's position determining means 22, the observation model generation means 24, and the states-of-people estimation means 25.

The number-of-people estimation means 21 estimates a number of persons within a partial area, based on a partial area image of an image acquired by an image acquisition device (e.g., the image acquisition device 1), by a predetermined partial area.

The approximate one's position determining means 22 corrects a number of persons within a partial area to an integer, for each partial area, determines an approximate position of a person by the corrected number of persons on the image based on information relating to the partial area, calculates a number-of-people correction coefficient, based on a number of persons before correction and a number of persons after correction, and determines that a person is observed at an approximate position.

The observation model generation means 24 generates an observation model relating to an observation value representing a person, based on an approximate position of a person associated with an observed person, for each observed person, and information relating to a partial area.

The states-of-people estimation means 25 predicts a current state of a particle from a state of a particle representing a past state of a person stored in a storage means (e.g., the states-of-people storage means 32), adds a new particle, and updates a weight of a particle by evaluating a probability of a current state of a particle, based on an observation model generated for each observed person and a number-of-people correction coefficient, stores an acquired state of a particle in the storage means by resampling a particle with a probability proportional to a weight of the particle, and outputs the acquired state of the particle, as a flow of people.

According to this configuration, it is possible to estimate a flow of people even in a crowded environment.

Figure 17:
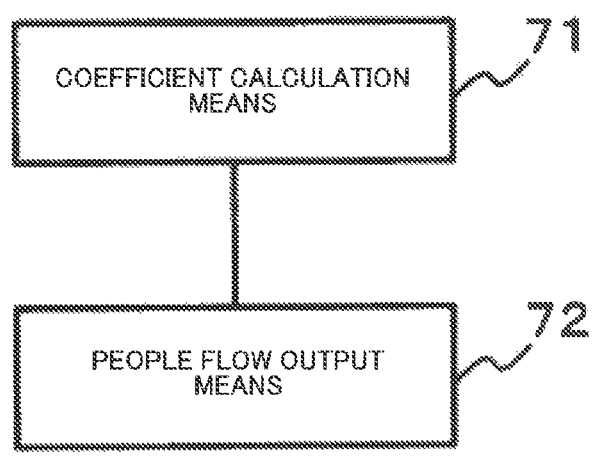
FIG. 17 is another schematic diagram illustrating an overview of the present invention.

An overview of the present example embodiment is also described as illustrated in FIG. 17. A people flow estimation device in the present example embodiment illustrated in FIG. 17 includes a coefficient calculation means 71 and a flow-of-people output means 72.

The coefficient calculation means 71 (e.g., the approximate one's position determining means 22) calculates a number-of-people correction coefficient, based on a number of persons estimated as a number of persons within a partial area, for each partial area of an image to be input, and a correction value with which the number of persons is corrected.

The flow-of-people output means 72 (e.g., the states-of-people estimation means 25) updates a weight of a particle representing a state of a person, based on a particle PHD filter and a number-of-people correction coefficient, and outputs a state of a particle resampled based on a weight after updating, as a flow of people.

According to the above-described configuration, it is possible to estimate a flow of people even in a crowded environment.

The above-described example embodiments of the present invention may be described as the following supplementary notes, but are not limited to the following.

Supplementary Note 1

A people flow estimation device comprising:
number-of-people estimation means for estimating, for each partial area of an image, a number of persons within the partial area, based on a partial area image to be specified in the partial area;
approximate one's position determining means for correcting the number of persons within the partial area to an integer, determining, for the each partial area, an approximate position of a person by the corrected number of persons on the image, based on information relating to the partial area, calculating a number-of-people correction coefficient, based on the number of persons before correction and the number of persons after correction, and determining that the person is observed at the approximate position;
observation model generation means for generating an observation model relating to an observation value representing the person, based on the approximate position of the observed person, for the each observed person, and information relating to the partial area; and states-of-people estimation means for predicting a current state of one or more particles from a past state of the particles representing a past state of the person stored in storage means, adding new particles and updating a weight of the particles by evaluating probability of the predicted state of the particles and a state of the added particles, based on an observation model generated for each observed person and the number-of-people correction coefficient, storing, in the storage means, the state of the particles acquired by resampling the particles with a probability proportional to the updated weight, and outputting the acquired state of the particles as information on a flow of people.

Supplementary Note 2

The people flow estimation device according to Supplementary Note 1, wherein
the approximate one's position determining means determines, as the approximate position of the person, a random position within the partial area, a center position of the partial area, or a random position in a person's area within the partial area.

Supplementary Note 3

The people flow estimation device according to Supplementary Note 1 or 2, wherein
the approximate one's position determining means calculates the number-of-people correction coefficient by dividing the number of persons before correction by the number of persons after correction.

Supplementary Note 4

The people flow estimation device according to any one of Supplementary Notes 1 to 3, wherein the observation model generation means generates, for each observed person, the observation model in which at least one of a position of the person on the image and a size of the person on the image is set as the observation value, based on the approximate position of the observed person, and information relating to the partial area.

Supplementary Note 5

The people flow estimation device according to any one of Supplementary Notes 1 to 4, further comprising
motion information acquisition means for acquiring motion information from the image, wherein
the observation model generation means generates, for each observed person, the observation model in which at least one or both of a speed and a moving direction of the person on the image is set as the observation value, based on the approximate position of the observed person, the motion information associated with the approximate position of the person, and information relating to the partial area.

Supplementary Note 6

The people flow estimation device according to any one of Supplementary Notes 1 to 5, further comprising
motion information acquisition means for acquiring motion information from the image, wherein
the observation model generation means generates, as a histogram on at least one or both of a speed and a direction, for each observed person, the observation model in which at least one or both of a speed and a moving direction of the person on the image is set as the observation value, based on the motion information within the partial area associated with the observed person.

Supplementary Note 7

The people flow estimation device according to any one of Supplementary Notes 1 to 6, wherein
the states-of-people estimation means determines a number of particles to be added as the new particles, for each partial area, by calculating a product of the number of persons within the partial area, a number of particles per person, and an appearance probability of the person, and adds the new particles by the determined number of particles at a position based on the associated partial area.

Supplementary Note 8

The people flow estimation device according to any one of Supplementary Notes 1 to 7, further comprising
number-of-passing-people calculation means for extracting one or more particles passing a predetermined crossed line in each passing direction, based on a current state of the particles output as the flow of people, a past position of the particles estimated from a state of the particles, a past state of the particles output as the flow of people at a previous time, and a current position of the particles predicted from a state of the particles, and calculating a number of persons passing the crossed line in each passing direction by using the weight of the extracted particles.

Supplementary Note 9

The people flow estimation device according to any one of Supplementary Notes 1 to 8, further comprising display control means for, when the particles are subjected to clustering, and a closed space for surrounding the particles belonging to a same cluster is set, or when the closed space is set from an outside, calculating the number of persons within the closed space from the weight of the particles within the closed space, calculating a representative velocity from a moving velocity of the particles within the closed space, and displaying, on a display device, the closed space, the number of persons, an arrow representing the representative velocity, and a numerical value or a phrase associated with the representative velocity.

Supplementary Note 10

A people flow estimation device comprising:
coefficient calculation means for calculating a number-of-people correction coefficient, for each partial area of an image to be input, based on a number of persons estimated as a number of persons within the partial area, and a correction value with which the number of persons is corrected; and
people flow output means for updating a weight of particles representing a state of a person, based on a particle probability hypothesis density (PHD) filter and the number-of-people correction coefficient, and outputting, as a flow of people, a state of the particles resampled based on the updated weight.

Supplementary Note 11

A people flow estimation method comprising:
estimating, for each partial area of an image, a number of persons within the partial area, based on a partial area image to be specified in the partial area;
correcting, for the each partial area, the number of persons within the partial area to an integer, determining an approximate position of a person by the corrected number of persons on the image, based on information relating to the partial area, calculating a number-of-people correction coefficient, based on the number of persons before correction and the number of persons after correction, and determining that the person is observed at the approximate position:
generating, for each observed person, an observation model relating to an observation value representing the person, based on the approximate position of the observed person and information relating to the partial area; and
predicting a current state of the particles from a state of the particles representing a past state of the person stored in storage means, adding new particles and updating a weight of the particles by evaluating probability of the predicted state of the particles and a state of the added particles, based on an observation model generated for each observed person and the number-of-people correction coefficient, storing, in the storage means, a state of the particles acquired by resampling the particles with a probability proportional to the updated weight, and outputting the acquired state of the particles as information on a flow of people.

Supplementary Note 12

The people flow estimation method according to Supplementary Note 11, further comprising:
determining, as the approximate position of the person, a random position within the partial area, a center position of the partial area, or a random position in a person's area within the partial area.

Supplementary Note 13

The people flow estimation method according to Supplementary Note 11 or 12, further comprising:
calculating the number-of-people correction coefficient by dividing the number of persons before correction by the number of persons after correction.

Supplementary Note 14

The people flow estimation method according to any one of Supplementary Notes 11 to 13, further comprising:
generating, for each observed person, the observation model in which at least one of a position of the person on the image and a size of the person on the image is set as the observation value, based on the approximate position of the observed person and information relating to the partial area.

Supplementary Note 15

The people flow estimation method according to any one of Supplementary Notes 11 to 14, further comprising:
acquiring motion information from the image; and
generating, for each observed person, the observation model in which at least one or both of a speed and a moving direction of the observed person on the image is set as the observation value, based on the approximate position of the observed person, the motion information associated with the approximate position, and information relating to the partial area.

Supplementary Note 16

The people flow estimation method according to any one of Supplementary Notes 11 to 15, further comprising:
acquiring motion information from the image; and
generating, for each observed person, the observation model in which at least one or both of a speed and a moving direction of the observed person on the image is set as the observation value, as a histogram on at least one or both of the speed and the direction, based on the motion information within the partial area associated with the observed person.

Supplementary Note 17

The people flow estimation method according to any one of Supplementary Notes 11 to 16, further comprising
determining a number of particles to be added as the new particles, for each partial area, by calculating a product of the number of persons within the partial area, a number of particles per person, and an appearance probability of the person, and adding particles by the number of particles at a position based on the partial area associated with the person.

Supplementary Note 18

The people flow estimation method according to any one of Supplementary Notes 11 to 17, further comprising
extracting one or more particles passing a predetermined crossed line in each passing direction, based on a current state of the particles output as the flow of people, a past position of the particles estimated from a state of the particles, a past state of the particles output as the flow of people at a previous time, and a current position of the particles predicted from a state of the particles, and calculating a number of persons passing the crossed line in each passing direction by using the weight of the extracted particles.

Supplementary Note 19

The people flow estimation method according to any one of Supplementary Notes 11 to 18, further comprising,
when the particles are subjected to clustering, and a closed space for surrounding the particles belonging to a same cluster is set, or when the closed space is set from an outside, calculating a number of persons within the closed space from the weight of the particles within the closed space, calculating a representative velocity from a moving velocity of the particles within the closed space, and displaying, on a display device, the closed space, the number of persons, an arrow representing the representative velocity, and a numerical value or a phrase associated with the representative velocity.

Supplementary Note 20

A people flow estimation method comprising:
calculating a number-of-people correction coefficient, for each partial area of an image to be input, based on a number of persons estimated as the number of persons within the partial area, and a correction value with which the number of persons is corrected; and
updating a weight of the particles representing a state of the person, based on a particle probability hypothesis density (PHD) filter and the number-of-people correction coefficient, and outputting, as a flow of people, a state of the particles resampled based on the updated weight.

Supplementary Note 21

A non-transitory recording medium having a people flow estimation program recorded therein, the people flow estimation program causing a computer to execute:
number-of-people estimation processing of estimating, for each partial area of an image, a number of persons within the partial area, based on a partial area image to be specified in the partial area;
approximate one's position determining processing of correcting the number of persons within the partial area to an integer, for the each partial area, determining an approximate position of the person by the corrected number of persons on the image, based on information relating to the partial area, calculating a number-of-people correction coefficient, based on the number of persons before correction and the number of persons after correction, and determining that the person is observed at the approximate position;
observation model generation processing of generating, for the each observed person, an observation model relating to an observation value representing the person, based on the approximate position of the observed person and information relating to the partial area; and
states-of-people estimation processing of predicting a current state of one or more particles from a state of the particles representing a past state of the person stored in storage means, adding new particles and updating a weight of the particles, by evaluating probability of the predicted state of the particles and a state of the added particles, based on the observation model generated for each observed person and the number-of-people correction coefficient, storing, in the storage means, a state of the particles acquired by resampling the particles with a probability proportional to the updated weight, and outputting the acquired state of the particles as information on a flow of people.

Supplementary Note 22

The recording medium according to Supplementary Note 21, wherein
the people flow estimation program further causes the computer to determine, in the approximate one's position determining processing, a random position within the partial area, a center position of the partial area, or a random position in a person's area within the partial area, as the approximate position of the person.

Supplementary Note 23

The recording medium according to Supplementary Note 21 or 22, wherein
the people flow estimation program further causes the computer to calculate, in the approximate one's position determining processing, the number-of-people correction coefficient by dividing the number of persons before correction by the number of persons after correction.

Supplementary Note 24

The recording medium according to any one of Supplementary Notes 21 to 23, wherein
the people flow estimation program further causes the computer to generate, in the observation model generation processing, for each observed person, the observation model in which at least one of a position of the person on the image and a size of the person on the image is set as the observation value, based on the approximate position of the observed person, and information relating to the partial area.

Supplementary Note 25

The recording medium according to any one of Supplementary Notes 21 to 24, wherein
the people flow estimation program causes the computer to further execute motion information acquisition processing of acquiring motion information from the image, and
to generate, in the observation model generation processing, for each observed person, an observation model in which at least one or both of a speed and a moving direction of the person on the image is set as the observation value, based on the approximate position of the observed person, the motion information associated with the approximate position, and information relating to the partial area.

Supplementary Note 26

The recording medium according to any one of Supplementary Notes 21 to 25, wherein
the people flow estimation program causes the computer to further execute motion information acquisition processing of acquiring motion information from the image, and
to generate, in the observation model generation processing, for each observed person, an observation model in which at least one or both of a speed and a moving direction of the person on the image is set as the observation value, as a histogram on at least one or both of a speed and a direction, based on the motion information within the partial area associated with the observed person.

Supplementary Note 27

The recording medium according to any one of Supplementary Notes 21 to 26, wherein the people flow estimation program further causes the computer to determine, in the states-of-people estimation processing, a number of particles to be added as the new particles, for each partial area, by calculating a product of the number of persons within the partial area, a number of particles per person, and an appearance probability of the person, and add the particles by the number of particles at a position based on the partial area associated with the observed person.

Supplementary Note 28

The recording medium according to any one of Supplementary Notes 21 to 27, wherein the people flow estimation program causes the computer to further execute number-of-passing-people calculation processing of extracting one or more particles passing a predetermined crossed line in each passing direction, based on a current state of the particles output as the flow of people, a past position of the particles estimated from a state of the particles, a past state of the particles output as the flow of people at a previous time, and a current position of the particles predicted from a state of the particles, and calculating a number of persons passing the crossed line in each passing direction by using the weight of the extracted particles.

Supplementary Note 29

The recording medium according to any one of Supplementary Notes 21 to 28, wherein the people flow estimation program causes the computer to further execute display control processing of, when the particles are subjected to clustering, and a closed space for surrounding the particles belonging to a same cluster is set, or when the closed space is set from an outside, calculating a number of persons within the closed space from the weight of the particles within the closed space, calculating a representative velocity from a moving velocity of the particles within the closed space, and displaying, on a display device, the closed space, the number of persons, an arrow representing the representative velocity, and a numerical value or a phrase associated with the representative velocity.

Supplementary Note 30

A non-transitory recording medium having a people flow estimation program recorded therein, the people flow estimation program causing a computer to execute:

coefficient calculation processing of calculating a number-of-people correction coefficient, for each partial area of an image to be input, based on a number of persons estimated as a number of persons within the partial area, and a correction value with which the number of persons is corrected; and people flow output processing of updating a weight of one or more particles representing a state of a person, based on a particle probability hypothesis density (PHD) filter and the number-of-people correction coefficient, and outputting, as a flow of people, a state of the particles resampled based on the updated weight.

In the foregoing, the present invention is described by using the above-described example embodiments as an exemplary example. The present invention, however, is not limited to the above-described example embodiments. Specifically, the present invention is applicable to various aspects comprehensible to a person skilled in the art within the scope of the present invention.

INDUSTRIAL APPLICABILITY

The present invention is appropriately applied to a people flow estimation device for estimating a flow of people. Further, the present invention is usable for suspicious person recognition, recognition on suspicious goods that are left behind, abnormal state recognition, abnormal behavior recognition, and the like in a monitoring field where estimation of a flow of people is necessary, for example. Further, the present invention is usable for a behavior analysis in a marketing field, an analysis in an environmental condition, and the like, for example. Furthermore, the present invention is also applicable for use as an input interface which transmits an estimation result on a flow of people to another device. Moreover, the present invention is also applicable to a video/video search device and the like in which a flow of people acquired as an estimation result is employed as a trigger key.

REFERENCE SIGNS LIST

1 Image acquisition device
2, 4, 6 Data processing device
3, 5 Storage device
7 Display device
21 Number-of-people estimation means
22 Approximate one's position determining means
23 Motion information acquisition means
24 Observation model generation means
25 States-of-people estimation means
26 Number-of-passing-people calculation means
27 Display control means
31 Partial area group storage means
32 States-of-people storage means
33 Crossed line storage means
71 Coefficient calculation means
72 Flow-of-people output means
251 States-of-people prediction means
252 States-of-people evaluation means
253 States-of-people updating means

The invention claimed is:

1. A people flow estimation device comprising:
a memory storing a computer program; and
at least one processor executing the computer program to perform:
estimating, for each partial area of an image, a number of persons within the partial area, based on a partial area image to be specified in the partial area;
correcting the number of persons within the partial area to an integer, determining, for the each partial area, an approximate position of a person by the corrected number of persons on the image, based on information relating to the partial area, calculating a number-of-people correction coefficient, based on the number of persons before correction and the number of persons after correction, and determining that the person is observed at the approximate position;
generating an observation model relating to an observation value representing the person, based on the approximate position of the observed person, for the each observed person, and information relating to the partial area; and
predicting a current state of one or more particles from a past state of the particles representing a past state of the person stored in a storage, adding new particles and updating a weight of the particles by evaluating probability of the predicted state of the particles and a state of the added particles, based on an observation model generated for each observed person and the number-of-people correction coefficient, storing, in the storage, the state of the particles acquired by resampling the particles with a probability proportional to the updated weight, and outputting the acquired state of the particles as information on a flow of people.

2. The people flow estimation device according to claim 1, wherein
the at least one processor performs determining, as the approximate position of the person, a random position within the partial area, a center position of the partial area, or a random position in a person's area within the partial area.

3. The people flow estimation device according to claim 1, wherein
the at least one processor performs calculating the number-of-people correction coefficient by dividing the number of persons before correction by the number of persons after correction.

4. The people flow estimation device according to claim 1, wherein
the at least one processor performs generating, for each observed person, the observation model in which at least one of a position of the person on the image and a size of the person on the image is set as the observation value, based on the approximate position of the observed person, and information relating to the partial area.

5. The people flow estimation device according to claim 1, the at least one processor performs:
acquiring motion information from the image, and
generating, for each observed person, the observation model in which at least one or both of a speed and a moving direction of the person on the image is set as the observation value, based on the approximate position of the observed person, the motion information associated with the approximate position of the person, and information relating to the partial area.

6. The people flow estimation device according to claim 1, the at least one processor performs:
acquiring motion information from the image, and
generating, as a histogram on at least one or both of a speed and a direction, for each observed person, the observation model in which at least one or both of a speed and a moving direction of the person on the image is set as the observation value, based on the motion information within the partial area associated with the observed person.

7. The people flow estimation device according to claim 1, wherein
the at least one processor performs determining a number of particles to be added as the new particles, for each partial area, by calculating a product of the number of persons within the partial area, a number of particles per person, and an appearance probability of the person, and adds the new particles by the determined number of particles at a position based on the associated partial area.

8. The people flow estimation device according to claim 1, the at least one processor performs
extracting one or more particles passing a predetermined crossed line in each passing direction, based on a current state of the particles output as the flow of people, a past position of the particles estimated from a state of the particles, a past state of the particles output as the flow of people at a previous time, and a current position of the particles predicted from a state of the particles, and calculating a number of persons passing the crossed line in each passing direction by using the weight of the extracted particles.

9. The people flow estimation device according to claim 1, the at least one processor performs
when the particles are subjected to clustering, and a closed space for surrounding the particles belonging to a same cluster is set, or when the closed space is set from an outside, calculating the number of persons within the closed space from the weight of the particles within the closed space, calculating a representative velocity from a moving velocity of the particles within the closed space, and displaying, on a display device, the closed space, the number of persons, an arrow representing the representative velocity, and a numerical value or a phrase associated with the representative velocity.

10. A people flow estimation method comprising:
estimating, for each partial area of an image, a number of persons within the partial area, based on a partial area image to be specified in the partial area;
correcting, for the each partial area, the number of persons within the partial area to an integer, determining an approximate position of a person by the corrected number of persons on the image, based on information relating to the partial area, calculating a number-of-people correction coefficient, based on the number of persons before correction and the number of persons after correction, and determining that the person is observed at the approximate position;
generating, for each observed person, an observation model relating to an observation value representing the person, based on the approximate position of the observed person and information relating to the partial area; and
predicting a current state of the particles from a state of the particles representing a past state of the person stored in a storage, adding new particles and updating a weight of the particles by evaluating probability of the predicted state of the particles and a state of the added particles, based on an observation model generated for each observed person and the number-of-people correction coefficient, storing, in the storage, a state of the particles acquired by resampling the particles with a probability proportional to the updated weight, and outputting the acquired state of the particles as information on a flow of people.

11. The people flow estimation method according to claim 10, further comprising:
determining, as the approximate position of the person, a random position within the partial area, a center position of the partial area, or a random position in a person's area within the partial area.

12. The people flow estimation method according to claim 10, further comprising:
calculating the number-of-people correction coefficient by dividing the number of persons before correction by the number of persons after correction.

13. The people flow estimation method according to claim 10, further comprising:
generating, for each observed person, the observation model in which at least one of a position of the person on the image and a size of the person on the image is set as the observation value, based on the approximate position of the observed person and information relating to the partial area.

14. The people flow estimation method according to claim 10, further comprising:
   acquiring motion information from the image; and
   generating, for each observed person, the observation model in which at least one or both of a speed and a moving direction of the observed person on the image is set as the observation value, based on the approximate position of the observed person, the motion information associated with the approximate position, and information relating to the partial area.

15. The people flow estimation method according to claim 10, further comprising:
   acquiring motion information from the image; and
   generating, for each observed person, the observation model in which at least one or both of a speed and a moving direction of the observed person on the image is set as the observation value, as a histogram on at least one or both of the speed and the direction, based on the motion information within the partial area associated with the observed person.

16. The people flow estimation method according to claim 10, further comprising
   determining a number of particles to be added as the new particles, for each partial area, by calculating a product of the number of persons within the partial area, a number of particles per person, and an appearance probability of the person, and adding particles by the number of particles at a position based on the partial area associated with the person.

17. A non-transitory recording medium having a people flow estimation program recorded therein, the people flow estimation program causing a computer to execute:

number-of-people estimation processing of estimating, for each partial area of an image, a number of persons within the partial area, based on a partial area image to be specified in the partial area;

approximate one's position determining processing of correcting the number of persons within the partial area to an integer, for the each partial area, determining an approximate position of the person by the corrected number of persons on the image, based on information relating to the partial area, calculating a number-of-people correction coefficient, based on the number of persons before correction and the number of persons after correction, and determining that the person is observed at the approximate position;

observation model generation processing of generating, for the each observed person, an observation model relating to an observation value representing the person, based on the approximate position of the observed person and information relating to the partial area; and states-of-people estimation processing of predicting a current state of one or more particles from a state of the particles representing a past state of the person stored in a storage, adding new particles and updating a weight of the particles, by evaluating probability of the predicted state of the particles and a state of the added particles, based on the observation model generated for each observed person and the number-of-people correction coefficient, storing, in the storage, a state of the particles acquired by resampling the particles with a probability proportional to the updated weight, and outputting the acquired state of the particles as information on a flow of people.

* * * * *